US011271908B2

(12) United States Patent
Soundararajan et al.

(10) Patent No.: US 11,271,908 B2
(45) Date of Patent: Mar. 8, 2022

(54) SYSTEMS AND METHODS FOR HIDING IDENTITY OF TRANSACTING PARTY IN DISTRIBUTED LEDGER TRANSACTION BY HASHING DISTRIBUTED LEDGER TRANSACTION ID USING SECURED REPRESENTATION OF DISTRIBUTED LEDGER ADDRESS OF TRANSACTING PARTY AS A KEY

(71) Applicant: Hewlett Packard Enterprise Development LP, Houston, TX (US)

(72) Inventors: Abilash Soundararajan, Bangalore (IN); Michael Reid Tennefoss, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 65 days.

(21) Appl. No.: 16/050,730

(22) Filed: Jul. 31, 2018

(65) Prior Publication Data
US 2020/0045020 A1     Feb. 6, 2020

(51) Int. Cl.
| | | |
|---|---|---|
| H04L 9/20 | (2006.01) | |
| G06F 21/64 | (2013.01) | |
| H04L 29/06 | (2006.01) | |
| H04L 9/32 | (2006.01) | |
| H04L 9/06 | (2006.01) | |
| H04L 9/16 | (2006.01) | |

(52) U.S. Cl.
CPC ........ *H04L 63/0421* (2013.01); *H04L 9/0643* (2013.01); *H04L 9/3297* (2013.01); *H04L 2209/38* (2013.01)

(58) Field of Classification Search
None
See application file for complete search history.

(56) References Cited

U.S. PATENT DOCUMENTS

| | | | |
|---|---|---|---|
| 6,101,604 | A | 8/2000 | Barton |
| 6,963,363 | B1 | 11/2005 | Ohmura |
| 7,518,502 | B2 | 4/2009 | Austin et al. |
| 7,777,629 | B2 | 8/2010 | Lee et al. |
| 8,149,090 | B2 | 4/2012 | Hall et al. |

(Continued)

FOREIGN PATENT DOCUMENTS

| | | | |
|---|---|---|---|
| CN | 106059747 A | | 10/2016 |
| CN | 107154852 A | | 9/2017 |

(Continued)

OTHER PUBLICATIONS

Blockchain and Distributed Ledgers forTrusted Recordkeeping Systems. Lemieux et al. FTC. (Year: 2017).*

(Continued)

*Primary Examiner* — Venkat Perungavoor
(74) *Attorney, Agent, or Firm* — Sheppard Mullin Richter & Hampton LLP

(57) ABSTRACT

Implementations of the disclosure are directed to proving and creating on a distributed ledger a verifiable transaction record of a transaction between a user associated with user device and an agent associated with agent system, where the identities of the user and agent are hidden. Some implementations are directed to providing for hidden identity of claims where a distributed ledger identity of a user may be masked from an agent.

14 Claims, 22 Drawing Sheets

(56) References Cited

U.S. PATENT DOCUMENTS

| | | |
|---|---|---|
| 8,258,926 B2 | 9/2012 | Bayer et al. |
| 9,253,433 B2 | 2/2016 | Boss et al. |
| 9,324,091 B2 | 4/2016 | Randell et al. |
| 9,375,628 B2 | 6/2016 | DeAngelis et al. |
| 9,406,010 B2 | 8/2016 | Rujan et al. |
| 9,635,000 B1 | 4/2017 | Muftic |
| 9,672,710 B2 | 6/2017 | Nassar et al. |
| 9,714,099 B2 | 7/2017 | Dinkelmann et al. |
| 9,817,113 B2 | 11/2017 | Loftis et al. |
| 9,818,141 B2 | 11/2017 | Abuelsaad et al. |
| 9,881,216 B2 | 1/2018 | Buehler et al. |
| 9,898,782 B1 | 2/2018 | Winklevoss et al. |
| 9,980,137 B2 | 5/2018 | South et al. |
| 10,305,833 B1 | 5/2019 | MacGregor |
| 10,339,523 B2* | 7/2019 | McDonough .......... G06Q 20/14 |
| 10,361,866 B1 | 7/2019 | McGregor et al. |
| 10,375,050 B2 | 8/2019 | Lyons et al. |
| 10,424,189 B2 | 9/2019 | Daoura et al. |
| 10,580,281 B2 | 3/2020 | Daoura et al. |
| 10,581,847 B1 | 3/2020 | Sun et al. |
| 10,594,689 B1 | 3/2020 | Weaver et al. |
| 10,614,646 B1 | 4/2020 | Douglass et al. |
| 10,652,018 B2* | 5/2020 | Smith ................ H04L 9/30 |
| 10,660,059 B1 | 5/2020 | Knas et al. |
| 10,755,226 B1 | 8/2020 | Robyak et al. |
| 10,757,672 B1 | 8/2020 | Knas et al. |
| 10,762,311 B2 | 9/2020 | Lemsitzer et al. |
| 10,778,438 B2 | 9/2020 | Shi et al. |
| 10,788,229 B2 | 9/2020 | Sinha et al. |
| 10,819,504 B2 | 10/2020 | Shi et al. |
| 10,825,324 B2 | 11/2020 | Haviv et al. |
| 10,826,684 B1 | 11/2020 | Winter et al. |
| 10,826,703 B1 | 11/2020 | Shipley |
| 10,833,843 B1 | 11/2020 | Vijayvergia et al. |
| 10,872,215 B2 | 12/2020 | Vancorenland et al. |
| 10,878,522 B2 | 12/2020 | Blackman et al. |
| 10,885,336 B1 | 1/2021 | Davis et al. |
| 10,917,744 B2 | 2/2021 | Brice et al. |
| 10,979,862 B2 | 4/2021 | Daoura et al. |
| 11,115,782 B2 | 9/2021 | Geiger et al. |
| 2005/0134459 A1 | 6/2005 | Glick et al. |
| 2006/0250231 A1 | 11/2006 | Wang et al. |
| 2008/0030345 A1 | 2/2008 | Austin et al. |
| 2008/0141027 A1 | 6/2008 | Kim et al. |
| 2010/0039284 A1 | 2/2010 | Hall et al. |
| 2013/0166455 A1 | 6/2013 | Feigelson |
| 2014/0040135 A1 | 2/2014 | Ovick et al. |
| 2014/0337232 A1 | 11/2014 | Glasgo |
| 2015/0269384 A1 | 9/2015 | Holman et al. |
| 2015/0269624 A1 | 9/2015 | Cheng et al. |
| 2015/0302409 A1 | 10/2015 | Malek et al. |
| 2016/0012465 A1 | 1/2016 | Sharp |
| 2016/0098723 A1 | 4/2016 | Feeney |
| 2016/0203522 A1 | 7/2016 | Shiffert et al. |
| 2016/0275461 A1 | 9/2016 | Sprague et al. |
| 2016/0292672 A1 | 10/2016 | Fay et al. |
| 2016/0321435 A1 | 11/2016 | McCoy et al. |
| 2016/0321675 A1 | 11/2016 | McCoy et al. |
| 2016/0328713 A1* | 11/2016 | Ebrahimi .............. G06F 21/645 |
| 2016/0330034 A1 | 11/2016 | Back et al. |
| 2016/0379213 A1 | 12/2016 | Isaacson et al. |
| 2017/0017955 A1* | 1/2017 | Stern ................ H04W 4/02 |
| 2017/0041328 A1 | 2/2017 | Stack et al. |
| 2017/0046526 A1 | 2/2017 | Chan et al. |
| 2017/0046689 A1 | 2/2017 | Lohe et al. |
| 2017/0046694 A1 | 2/2017 | Chow et al. |
| 2017/0046709 A1 | 2/2017 | Lee et al. |
| 2017/0048216 A1 | 2/2017 | Chow et al. |
| 2017/0069153 A1 | 3/2017 | Teicher |
| 2017/0083907 A1 | 3/2017 | McDonough et al. |
| 2017/0214522 A1 | 7/2017 | Code et al. |
| 2017/0215038 A1 | 7/2017 | Primm et al. |
| 2017/0230791 A1 | 8/2017 | Jones |
| 2017/0232300 A1 | 8/2017 | Tran et al. |
| 2017/0236350 A1 | 8/2017 | Lin |
| 2017/0242935 A1 | 8/2017 | Wragg et al. |
| 2017/0243193 A1 | 8/2017 | Manian et al. |
| 2017/0243208 A1 | 8/2017 | Kurian et al. |
| 2017/0262862 A1 | 9/2017 | Aljawhari |
| 2017/0316390 A1 | 11/2017 | Smith et al. |
| 2017/0317997 A1* | 11/2017 | Smith ................ H04L 9/3247 |
| 2017/0330174 A1 | 11/2017 | Demarinis et al. |
| 2017/0344988 A1 | 11/2017 | Cusden et al. |
| 2017/0364900 A1 | 12/2017 | Hudson et al. |
| 2018/0025166 A1 | 1/2018 | Daniel et al. |
| 2018/0048474 A1 | 2/2018 | Landrock et al. |
| 2018/0078843 A1 | 3/2018 | Tran et al. |
| 2018/0082294 A1 | 3/2018 | Davis et al. |
| 2018/0107914 A1 | 4/2018 | Ziola |
| 2018/0117446 A1 | 5/2018 | Tran et al. |
| 2018/0137512 A1* | 5/2018 | Georgiadis ............ H04L 63/126 |
| 2018/0144292 A1 | 5/2018 | Mattingly et al. |
| 2018/0144634 A1 | 5/2018 | Kim et al. |
| 2018/0145836 A1 | 5/2018 | Saur et al. |
| 2018/0167198 A1 | 6/2018 | Muller et al. |
| 2018/0176228 A1 | 6/2018 | He et al. |
| 2018/0189528 A1 | 7/2018 | Hanis et al. |
| 2018/0191503 A1 | 7/2018 | Alwar et al. |
| 2018/0197159 A1 | 7/2018 | Sheerin |
| 2018/0197173 A1 | 7/2018 | Durvasula et al. |
| 2018/0197186 A1 | 7/2018 | Sheerin |
| 2018/0205546 A1 | 7/2018 | Haque et al. |
| 2018/0240086 A1 | 8/2018 | Sobotka |
| 2018/0270065 A1 | 9/2018 | Brown et al. |
| 2018/0284093 A1 | 10/2018 | Brown et al. |
| 2018/0316502 A1 | 11/2018 | Nadeau et al. |
| 2018/0341945 A1 | 11/2018 | Welborn et al. |
| 2018/0343238 A1 | 11/2018 | Tola |
| 2018/0343307 A1 | 11/2018 | Lotter et al. |
| 2018/0351949 A1 | 12/2018 | Scott et al. |
| 2018/0365633 A1 | 12/2018 | Hanis et al. |
| 2019/0012637 A1 | 1/2019 | Gillen |
| 2019/0019144 A1 | 1/2019 | Gillen |
| 2019/0034917 A1 | 1/2019 | Nolan et al. |
| 2019/0034923 A1 | 1/2019 | Greco et al. |
| 2019/0036887 A1 | 1/2019 | Miller |
| 2019/0036906 A1 | 1/2019 | Biyani et al. |
| 2019/0068615 A1 | 2/2019 | Pack et al. |
| 2019/0080284 A1 | 3/2019 | Kim et al. |
| 2019/0080300 A1 | 3/2019 | Stojanovski |
| 2019/0087792 A1 | 3/2019 | Chow et al. |
| 2019/0102850 A1 | 4/2019 | Wheeler et al. |
| 2019/0108362 A1 | 4/2019 | Miller |
| 2019/0122258 A1 | 4/2019 | Bramberger et al. |
| 2019/0172026 A1* | 6/2019 | Vessenes ............... H04L 9/3247 |
| 2019/0180291 A1* | 6/2019 | Schmeling ............ G16H 20/10 |
| 2019/0188706 A1* | 6/2019 | McCurtis ............... G06Q 20/02 |
| 2019/0188708 A1 | 6/2019 | Shah |
| 2019/0213462 A1 | 7/2019 | McDonald et al. |
| 2019/0215162 A1 | 7/2019 | Dickenson et al. |
| 2019/0236214 A1 | 8/2019 | Kokernak |
| 2019/0253434 A1* | 8/2019 | Biyani .................. H04L 63/065 |
| 2019/0280875 A1 | 9/2019 | Ragnoni et al. |
| 2019/0289019 A1 | 9/2019 | Thekadath et al. |
| 2019/0294136 A1 | 9/2019 | Iacobone et al. |
| 2019/0295162 A1 | 9/2019 | Wang et al. |
| 2019/0302249 A1 | 10/2019 | High et al. |
| 2019/0303463 A1 | 10/2019 | Catalano et al. |
| 2019/0303951 A1 | 10/2019 | Bakalis |
| 2019/0305967 A1 | 10/2019 | Hamel et al. |
| 2019/0332838 A1 | 10/2019 | Vancorenland et al. |
| 2019/0333057 A1* | 10/2019 | Miller .................. G06Q 20/351 |
| 2019/0334698 A1 | 10/2019 | Singh |
| 2019/0340269 A1 | 11/2019 | Biernat et al. |
| 2019/0340584 A1 | 11/2019 | Arora et al. |
| 2019/0349190 A1 | 11/2019 | Smith et al. |
| 2019/0349426 A1 | 11/2019 | Smith et al. |
| 2019/0354943 A1 | 11/2019 | Mulye et al. |
| 2019/0361917 A1 | 11/2019 | Tran et al. |
| 2019/0366475 A1 | 12/2019 | Scarselli et al. |
| 2019/0370286 A1 | 12/2019 | Bertsch et al. |
| 2019/0372769 A1 | 12/2019 | Fisher et al. |
| 2019/0372773 A1 | 12/2019 | Bertsch et al. |
| 2019/0386822 A1 | 12/2019 | Ben-Simon et al. |

(56) References Cited

U.S. PATENT DOCUMENTS

| | | | |
|---|---|---|---|
| 2019/0391972 | A1 | 12/2019 | Bates et al. |
| 2020/0005398 | A1 | 1/2020 | Castinado et al. |
| 2020/0012806 | A1 | 1/2020 | Bates et al. |
| 2020/0013026 | A1* | 1/2020 | Noonan .............. G06Q 20/0658 |
| 2020/0034836 | A1 | 1/2020 | Shah |
| 2020/0034839 | A1 | 1/2020 | Soundararajan et al. |
| 2020/0034876 | A1 | 1/2020 | Soundararajan et al. |
| 2020/0034888 | A1 | 1/2020 | Soundararajan et al. |
| 2020/0034945 | A1 | 1/2020 | Soundararajan et al. |
| 2020/0036533 | A1 | 1/2020 | Soundararajan et al. |
| 2020/0036712 | A1 | 1/2020 | Soundararajan et al. |
| 2020/0037158 | A1 | 1/2020 | Soundararajan et al. |
| 2020/0050494 | A1 | 2/2020 | Bartfai-Walcott et al. |
| 2020/0051232 | A1 | 2/2020 | McGregor et al. |
| 2020/0076610 | A1 | 3/2020 | Wang |
| 2020/0092102 | A1 | 3/2020 | Wang |
| 2020/0101367 | A1 | 4/2020 | Tran et al. |
| 2020/0118094 | A1 | 4/2020 | Haldenby et al. |
| 2020/0119925 | A1 | 4/2020 | Wang |
| 2020/0134861 | A1 | 4/2020 | Zucker et al. |
| 2020/0143405 | A1 | 5/2020 | Tucker |
| 2020/0151401 | A1 | 5/2020 | Dyche et al. |
| 2020/0155944 | A1 | 5/2020 | Witchey et al. |
| 2020/0177377 | A1 | 6/2020 | Smith et al. |
| 2020/0184291 | A1 | 6/2020 | Tisdel |
| 2020/0192885 | A1 | 6/2020 | Grandau |
| 2020/0234386 | A1* | 7/2020 | Blackman .............. H04L 9/0894 |
| 2020/0265124 | A1 | 8/2020 | Li |
| 2020/0265356 | A1 | 8/2020 | Lee et al. |
| 2020/0265446 | A1 | 8/2020 | Vargas |
| 2020/0280454 | A1 | 9/2020 | Finlow-Bates |
| 2020/0294128 | A1 | 9/2020 | Cella |
| 2020/0311646 | A1 | 10/2020 | Koenig et al. |
| 2020/0311718 | A1* | 10/2020 | Verdian .............. G06Q 20/3674 |
| 2021/0089514 | A1 | 3/2021 | Werner et al. |
| 2021/0091960 | A1 | 3/2021 | Werner et al. |
| 2021/0092613 | A1 | 3/2021 | Palyutina et al. |
| 2021/0097893 | A1 | 4/2021 | Klappert et al. |
| 2021/0117970 | A1 | 4/2021 | Hugh et al. |
| 2021/0192441 | A1 | 6/2021 | Zhang |
| 2021/0224727 | A1 | 7/2021 | Rakhunde et al. |
| 2021/0248338 | A1 | 8/2021 | Spivack et al. |
| 2021/0304200 | A1* | 9/2021 | Doney .................... G06Q 20/36 |

FOREIGN PATENT DOCUMENTS

| | | |
|---|---|---|
| CN | 107392770 A | 11/2017 |
| CN | 107730188 A | 2/2018 |
| CN | 111213139 A | 5/2020 |
| EP | 3249599 | 11/2017 |
| JP | 2018-173692 A | 11/2018 |
| KR | 20180030971 A | 3/2018 |
| WO | WO2016189488 A2 | 12/2016 |
| WO | WO-2017027648 | 2/2017 |
| WO | WO2017165909 A1 | 10/2017 |
| WO | 2019/108168 A1 | 6/2019 |
| WO | 2019/199288 A1 | 10/2019 |
| WO | 2019/217531 A1 | 11/2019 |

OTHER PUBLICATIONS

Town Crier: An Authenticated Data Feed for Smart Contracts. Zhang. ACM. (Year: 2016).*

A Taxonomy of Blockchain-Based Systems for Architecture Design. Xu. IEEE. (Year: 2017).*

A Technical Overview of the XYO Network, Blockchain's Cryptographic Location Oracle Network, Retrieved on Jun. 7, 2018, 27 Pgs. https://medium.com/xyonetwork/whitepaper-b4793efe7609.

Axon, L. et al., "PB-PKI: a Privacy-Aware Blockchain-Based PKI," 2016, 8 pages, https://ora.ox.ac.uk/objects/uuid:8bd33c4f-5614-400e-b958-48e53fe1b342/download_file?file_format=application/pdf&safe_filename=SECRYPT_2017.pdf&type_of_work=Conference%20item.

Blockchain Meets Database: Replace or Combine?, (Research Paper), Aug. 29, 2017, 5 Pgs.

Blockchain will work in trucking—but only if these three things happen, Mar. 3, 2018, 9 Pgs. https://techcrunch.com/2018/03/02/blockchain-will-work-in-trucking-but-only-if-these-three-things-happen/.

Bocek et al, Blockchains Everywhere—a Use-case of Blockchains in the Pharma Supply-chain, IFIP, May 8-12, 2017, 6 Pgs.

Bojja, S. et al., "Dandelion: Redesigning the Bitcoin Network for Anonymity," Jun. 2017, 34 pages, https://dl.acm.org/citation.cfm?id=3084459.

Expert Market US, "What is a Point of Sale System?" retrieved online Jun. 19, 2018, 8 pages, https://www.expertmarket.com/pos/what-is-a-point-of-sale-system.

Github, "Blockchain Based Anonymous Distributed ID System," retrieved online Jun. 19, 2018, 13 pages, https://github.com/arnaucode/darkID-prototype.

Gray, M., Enterprise Smart Contracts, (Research Paper), Retrieved Jun. 25, 2018, 21 Pgs.

Hardjono, T. et al., "Anonymous Identities for Permissioned Blockchains," Jan. 20, 2016, 20 pages, http://connection.mit.edu/wp-content/uploads/sites/29/2014/12/Anonymous-Identities-for-Permissioned-Blockchains2.pdf.

Heijden, R.W.V.D. et al., Blackchain: Scalability for Resource-constrained Accountable Vehicle-to-x Communication, (Research Paper), Dec. 11-15, 2017, 5 Pgs.

Laneaxis ICO (axis Token): Blockchain Trucking & Freight Shipping Coin?, Retrieved Jun. 15, 2018, 3 Pgs.

Liu, W. et al., "Advanced Block-chain Architecture for E-health Systems," Oct. 12-15, 2017, https://ieeexplore.ieee.org/document/8210847/.

Mathies, D., How a Blockchain-based Digital Photo Notary is Fighting Fraud and Fake News, Digital Trends, Jan. 25, 2018, 11 Pgs.

Matthews, Alice, RFID inventory provides real time monitoring for retailers, Dec. 1, 2017, 4 Pgs.

Modum Ensuring Compliance & Improving Efficiency in the Pharma Supply Chain, Modum.io AG, Aug. 8, 2017, 9 Pgs.

On Zero-knowledge Proofs in Blockchains, (Web Page), Retrieved Jun. 26, 2018, 7 Pgs., https://medium.com/@argongroup/on-zero-knowledge-proofs-in-blockchains-14c48cfd1dd1.

Orenge, A., "Blockchain-based Provenance Solution for Handcrafted Jewellery," 2018, 72 pages, https://comserv.cs.ut.ee/home/files/THESIS_+Blockchan-based+Provenance+Solution+for+Handcrafted+Jewellery+-+Antony-Orenge.pdf?study=ATILoputoo&reference=FF850BE046C89CBDC66A2F372421A77120C7D340.

Park et al, Blockchain Security in Cloud Computing: Use Cases, Challenges, and Solutions, Symmetry 2017, 13 Pgs. http://www.mdpi.com/2073-8994/9/8/164/pdf.

Ramachandran A. et al., "Using Blockchain and Smart Contracts for Secure Data Provenance Management," Sep. 28, 2017, 11 pages, https://arxiv.org/pdf/1709.10000.pdf.

Shyft: Whitepaper, (Research Paper), 2018, 25 Pgs.

Sovrin Foundation, Sovrin™: A Protocol and Token for SelfSovereign Identity and Decentralized Trust, Jan. 2018, 42 pages, https://sovrin.org/wp-content/uploads/Sovrin-Protocol-and-Token-White-Paper.pdf.

Dobre et al., "Authentication of JPEG Images on the Blockchain", International Conference on Control, Artificial Intelligence, Robotics and Optimization—ICCAIRO, Research Gate, May 19-21, 2018, 12 pages.

Poudel et al., "Photograph Ownership and Authorization using Blockchain", 2019 Artificial Intelligence for Transforming Business and Society (AITB), 2019.

* cited by examiner

SYSTEMS AND METHODS FOR HIDING IDENTITY OF TRANSACTING PARTY IN DISTRIBUTED LEDGER TRANSACTION BY HASHING DISTRIBUTED LEDGER TRANSACTION ID USING SECURED REPRESENTATION OF DISTRIBUTED LEDGER ADDRESS OF TRANSACTING PARTY AS A KEY

DESCRIPTION OF THE RELATED ART

The digital world relies heavily on the use of identity for transactions, access to records, and verification of claims. Besides personal names, identity is typically assigned, generated, granted, and/or controlled by a central authority.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments.

Figure 1:
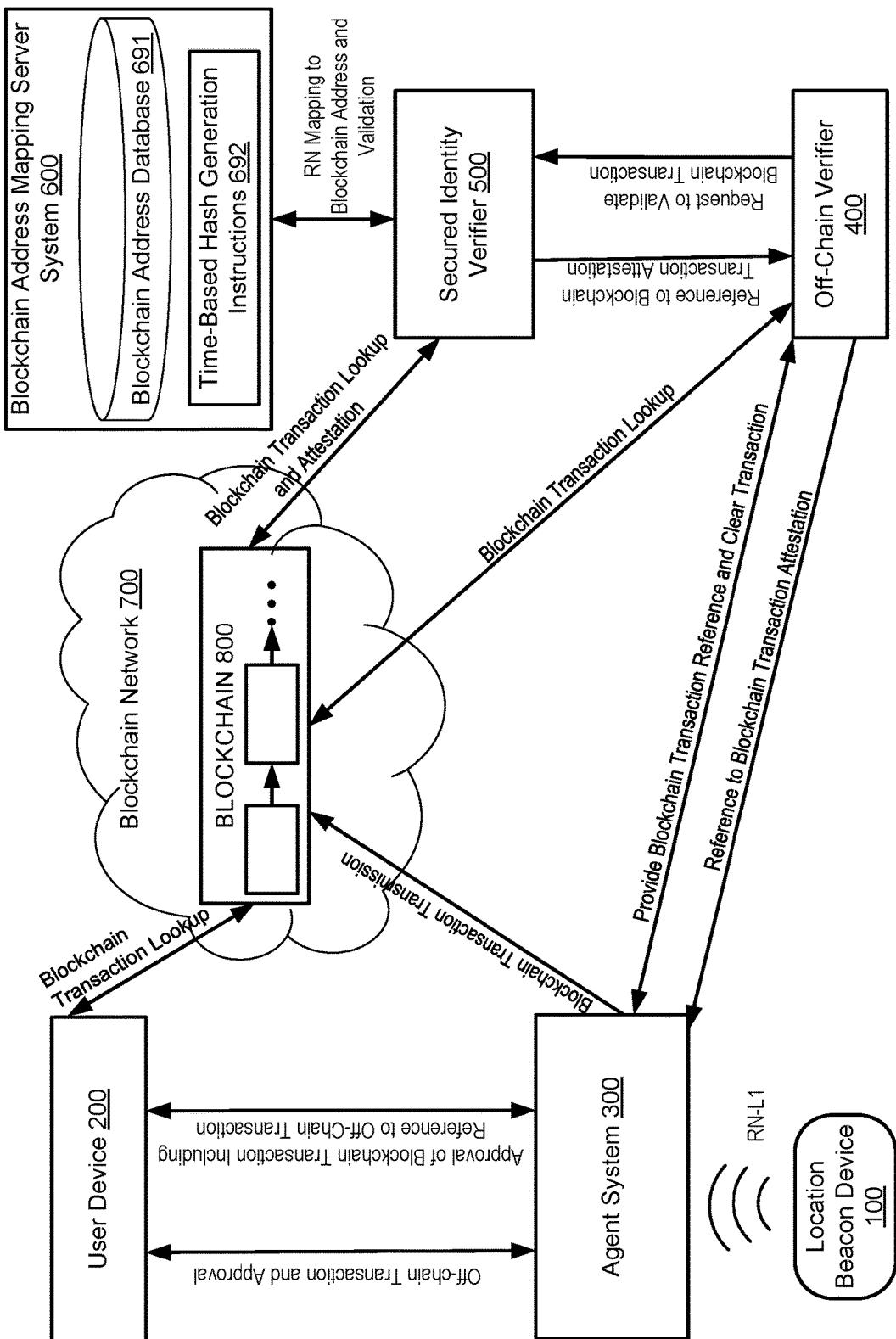
FIG. 1 is a diagram illustrating an example environment for proving and creating on a blockchain a verifiable transaction record of a transaction between a user associated with user device and an agent associated with the agent system, where the identities of the user and agent are hidden, in accordance with implementations of the disclosure.
Figure 2:
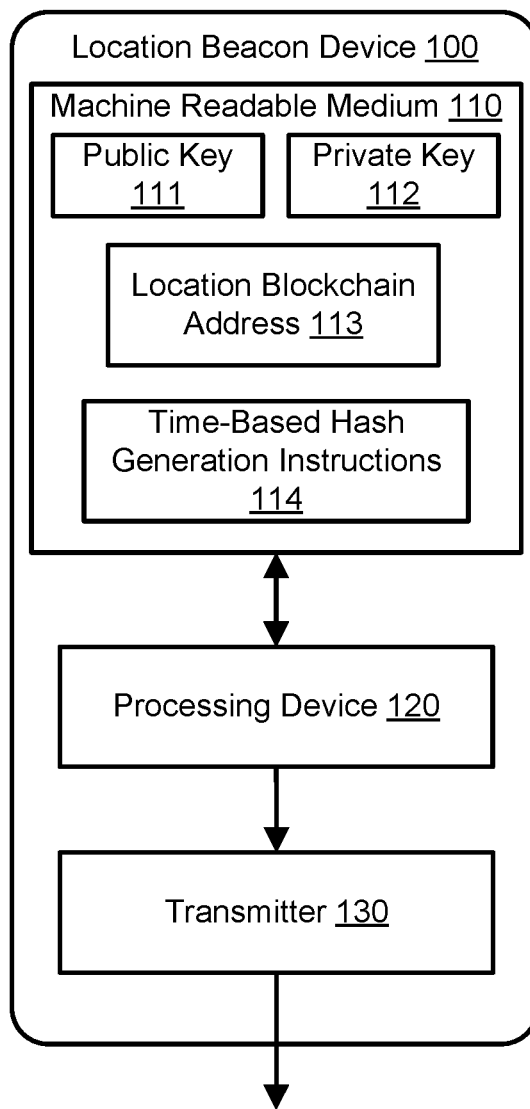
FIG. 2 is a block diagram illustrating an example architecture of components of a location beacon, in accordance with implementations of the disclosure.
Figure 3:
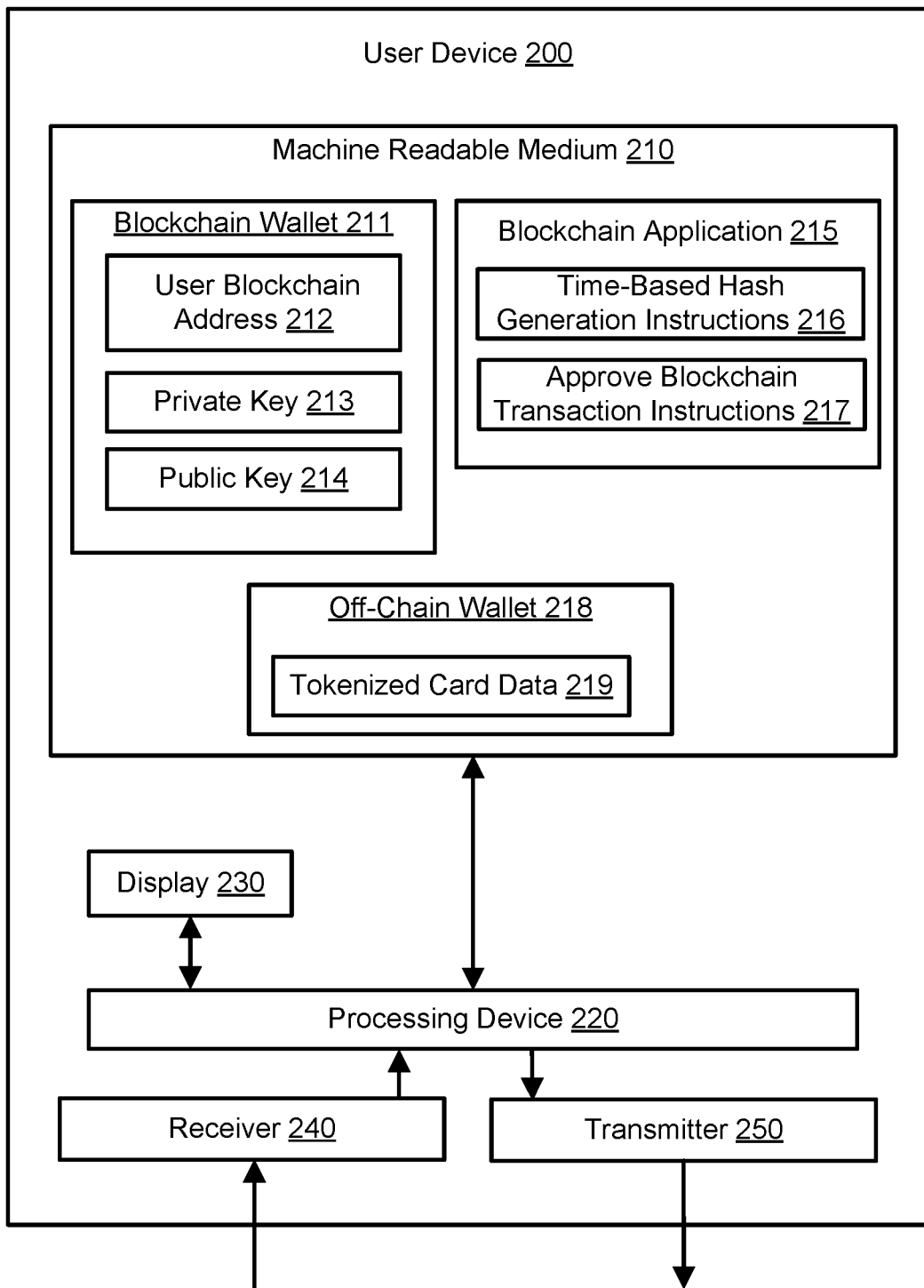
FIG. 3 is a block diagram illustrating an example architecture of a user device, in accordance with implementations of the disclosure.
Figure 4:
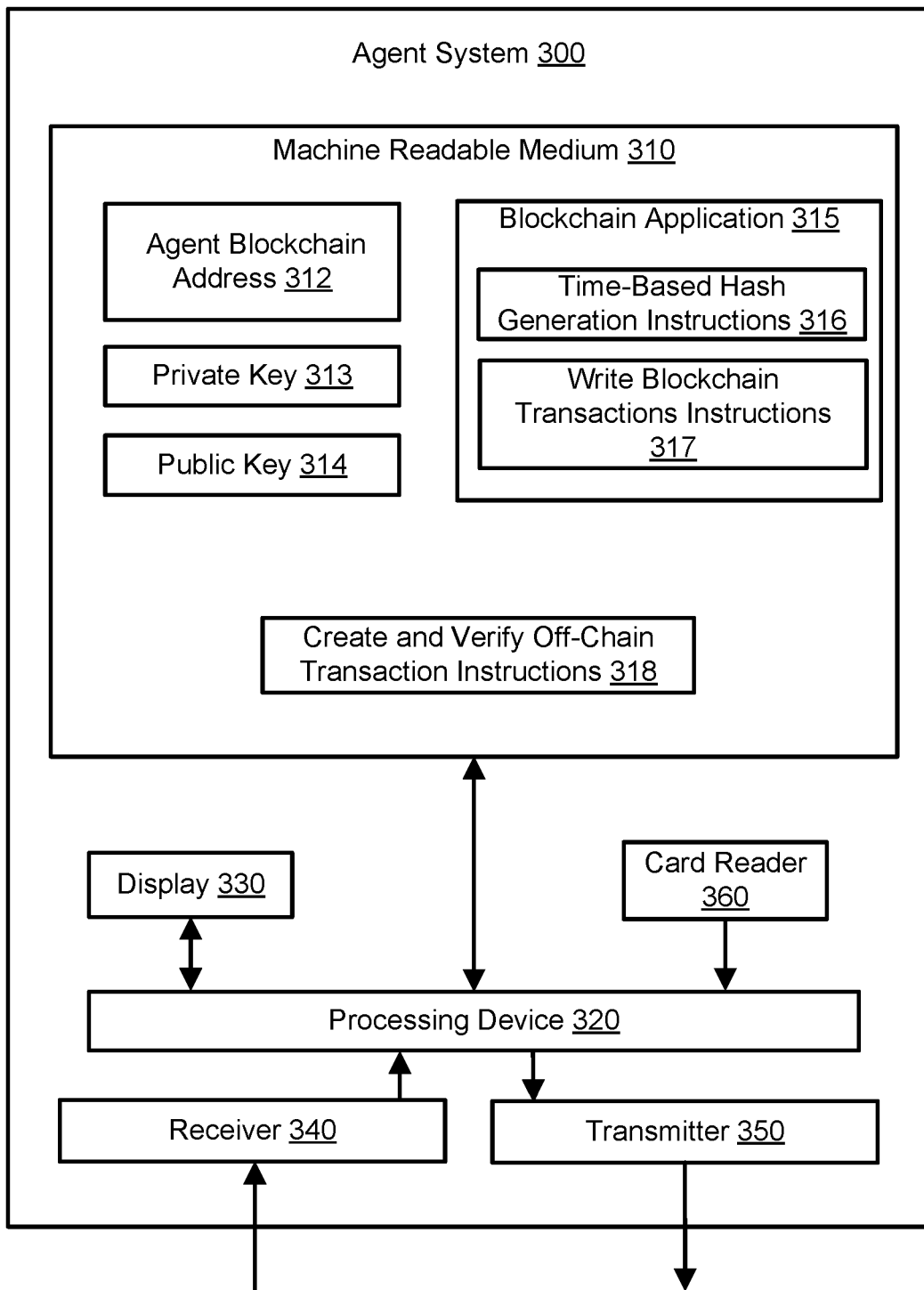
FIG. 4 is a block diagram illustrating an example architecture of an agent system, in accordance with implementations of the disclosure.
Figure 6:
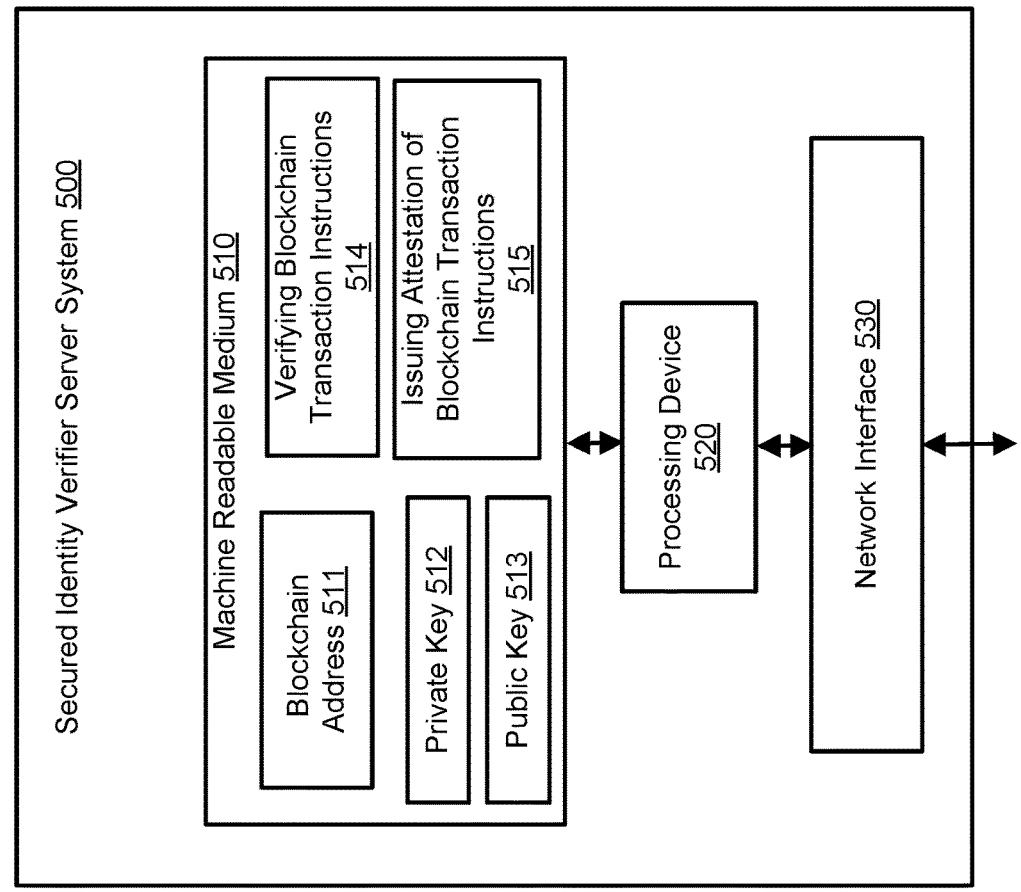
FIG. 6 is a block diagram illustrating an example architecture of a secured identity server system, in accordance with implementations of the disclosure.
Figure 5:
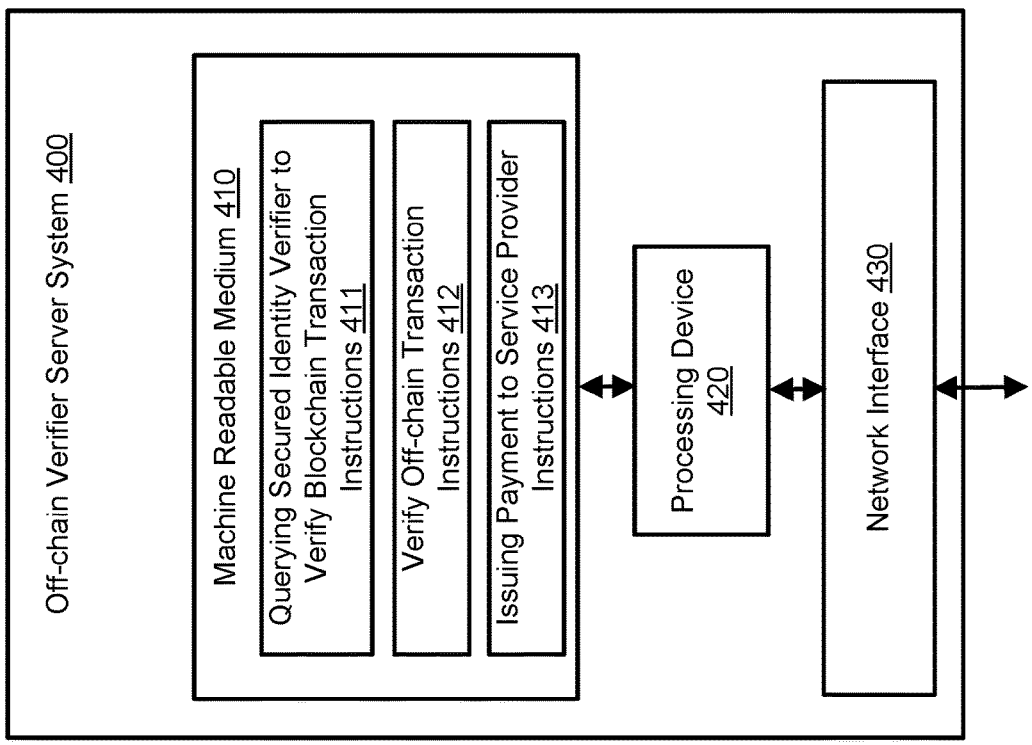
FIG. 5 is a block diagram illustrating an example architecture of an off-chain verifier server system, in accordance with implementations of the disclosure.

The figures are not intended to be exhaustive or to limit various embodiments to the precise form disclosed.

DETAILED DESCRIPTION

As used herein, the term "distributed ledger" generally refers to a shared digital ledger that is decentralized and shared between nodes distributed across a network. After a transaction that is approved to be written to the ledger is consented by at least the majority of the nodes, the contents of the ledger are synchronized across all the nodes. Different types of consensus mechanisms that bring in varying levels of processing requirements to agree on a transaction amongst distributed nodes may be utilized in a distributed ledger network. Examples of common consensus mechanisms include proof of work, proof of stake, proof of elapsed time, Kafka, etc. Various platforms have adopted different consensus mechanisms.

Distributed ledger technology (DLT) describes the superset of the different variations of this technology. One presently popular type of DLT is blockchain technology. While in a distributed ledger a transaction is written to the ledger after consensus, the requirement is more specific in a blockchain: transactions are aggregated in to a block and the block is appended to the last block of an existing linear chain of blocks. As such, all blockchains are a form of a distributed ledger, but all distributed ledgers are not necessarily a blockchain. BITCOIN and ETHEREUM are examples of blockchain-based platforms. Directed acyclic graphs (DAG) are another example of a common form of DLT. IOTA is an example of a DAG-based platform. HYPERLEDGER is an example of a DLT-based platform. Unless explicitly stated otherwise, implementations of the disclosure may apply to any variant of DLT, including blockchains, DAGs, etc.

Although embodiments of the disclosure will be primarily described in the context of blockchains, it should be appreciated that all embodiments, unless expressly stated otherwise, may be applied to other variants of distributed ledger technology. For example, to the extent an embodiment is described in the context of a blockchain network sharing a blockchain, it should be appreciated that the embodiment may more generally be applied in a distributed ledger network sharing a distributed ledger. Similarly, to the extent that an embodiment recites a "blockchain address," a "secured representation of a blockchain address," "a blockchain application," or "a blockchain transaction," it should be appreciated that the embodiment may more generally be applied using a "distributed ledger address," "a secured representation of a distributed ledger address," "a distributed ledger application," and/or "a distributed ledger transaction."

As used herein, the term "public blockchain" generally refers to a blockchain that is accessible to any entity and whereby any entity may participate in the consensus process. A public blockchain may be referred to as a "fully decentralized" blockchain.

As used herein, the term "private blockchain" generally refers to a blockchain where a limited set of trusted entities participate in a blockchain network. A permissioned set of trusted nodes may participate in the consensus process. For example, a consortium of multiple financial institutions may form a private blockchain network. The right to read a private blockchain may be public or restricted to trusted nodes. A private blockchain may be referred to as a permissioned blockchain. Although implementations of the disclosure will primarily be described in the context of private blockchains that are implemented by consortiums, it should be appreciated that the technology disclosed herein may be adapted for use in anything from public to private blockchains.

As used herein, the term "blockchain address" refers to an identifier for a receiver or a sender in a blockchain transaction. A unique blockchain address may be associated with a person, an animal, a corporation, a location, an asset, or some other thing.

As used herein, the terms "off-chain" and "off-chain transaction" refer to transactions that do not occur within a blockchain.

As used herein, the term "smart contract" refers to self-executing code residing on a blockchain network, which automates execution of contracts between trusted parties based on events on a blockchain or distributed ledger.

As used herein, the term "blockchain wallet" refers to a digital wallet that helps manage a user's blockchain account (s), including private and public keys associated with the identity owning the wallet. For example, in particular implementations, a blockchain wallet may be to manage cryptocurrency accounts.

As used herein, the term "secured representation of a blockchain address" generally refers to a value (e.g., a number in decimal format, hexadecimal format, etc.) that is generated by applying a time-based cryptographic hashing algorithm to a blockchain address.

As used herein, the terms "time-based one-time advertisement," "RN," "random number advertisement" and "TOTA" generally refer to a message including a one-time value generated by applying a cryptographic hash function using a blockchain address and a current timestamp. The generated one-time value may be referred to as an example of a "secured representation of a blockchain address." The TOTA may only be valid for a short period of time and only for one time usage. This short duration may be configured by a network administrator based on business requirement(s). The reason for limited usage of the advertisement may be to ensure that repeated usage of the advertisement is not nefariously done by people who have moved away from the location but want to use the same advertisement as their proof of being there.

As used herein, the term "fixed advertisement" generally refers to a printout or other display of a secured representation of a blockchain address that does not change over time. For example, a fixed advertisement may comprise a printed or electronic code such as a QR or passive RFID code that embeds a secured representation of a blockchain address that does not change over time. As fixed advertisements do not change over time, a fixed relationship between the secured representations of the blockchain addresses of the fixed advertisement and their respective clear versions may be maintained in a database table or other suitable data structure. The data structure may be referred to during verification to determine a clear version of a blockchain address corresponding to a fixed advertisement.

As used herein, the terms "interactive proving mechanism" and "interactive proving protocol" refer to a process whereby a verifier (e.g., a server system operating on a blockchain network) asks a prover (e.g., a client device) to answer one or more questions that require the prover to capture one or more secured representations of blockchain addresses. For example, an interactive proving mechanism may be performed to prove that an individual (e.g., an individual carrying a client device) is at a particular location at a particular time. As another example, an interactive proving mechanism may be performed to prove that an individual (e.g., an individual carrying a client device) has custody of an asset at a particular location and time. Every iteration of questioning after a first round of receiving data from the prover may prove the validity of a claim with higher confidence. In some cases, just the first round of questioning may be needed. The number of iterations and types of questions that are asked may vary depending upon the business application.

As used herein, the term "distributed attestation" generally refers to a verifiable claim that is written to a blockchain. For example, a distributed attestation may be a verifiable claim that attests to the presence of an entity at a particular location and time, a verifiable claim that attests to the custody of an asset by a user at a particular location and time, or some other verifiable claim. A distributed attestation may be reusable to verify a claim to various entities. A distributed attestation may include a secured representation of a blockchain address of an entity associated with a claim and/or a secured representation of a blockchain address of a location associated with a claim. A permissioned entity may be configured to verify the claim by determining clear versions of the secured representations of the blockchain addresses.

As used herein, the term "attestation holder" generally refers to a party to whom an attestation has been issued after verification of a past transaction by a verifier. This attestation may be a distributed attestation which may be used as a verifiable claim. The attestation may be issued to the attestation holder in a specific context which may also be captured in the attestation. The attestation holder may present a distributed attestation as a claim to another party to prove to the third party just what needs to be proved without any additional information, which may also include the identity of the attestation holder being secured by a secure representation which is verifiable by a verifier. In some cases, the attestation holder may present a distributed attestation as a claim to a third party that was not involved in a transaction attested to in the distributed attestation. For example, an attestation holder may be a purchaser of a television set presenting a distributed attestation as a claim to a service center that repairs televisions. The service center may submit the attestation presented by the claimed purchaser to a distributed verifier, who can confirm to the service center that the claimant of the attestation is actually the original owner of the TV and the actual attestation owner of the transaction by validating the secure identity embedded into the attestation presented.

As used herein, the term "centralized identity" generally refers to an identity of an entity that is created off-chain and maintained by a centralized entity. For example, a centralized identity may refer to a username maintained on an active directory service, an email address associated with a domain, etc.

To prevent transaction fraud and abuse of customer information by third parties, there is a need for a secure way of validating and recording transactions by all parties involved in the transaction. In particular, there is a need for a method that both: i) creates a record that proves that a transaction happened at a particular place and time between parties; and ii) prevents customer information (e.g., bankcard data) from being misused by third parties that may reside anywhere in the world, but claiming that they are customers by spoofing identity and conducting transactions with forged card data. First, some present methods for proving location of a transaction rely on global positioning system (GPS) and/or IP based location proofs that may be manipulated by spoofing the system into believing they are present at a specific physical location when in fact they are not. Additionally, although many present systems rely on a customer's signature (e.g., on a display of a point of sale (POS) terminal or printed receipt) to prove that a transaction occurred, signatures may be easily forged. Second, misuse of customer information has been a problem in some systems in the banking industry, where bankcard data has been stolen by attackers who gain access to the cards and/or who attach their own counterfeit card reader to a legitimate card reader (such as at an ATM terminal) to skim the bankcard data from an unwitting customer when the customer uses the card reader.

To this end, implementations of the disclosure are directed to systems and methods for creating, on a distributed ledger, a verifiable record of a transaction between two parties that includes secured representations of distributed ledger addresses to hide the identities of the parties and/or transaction location involved of the transaction. By virtue of implementing the systems and methods described herein: i) a verifiable record of a transaction may be created on a distributed ledger; and ii) the identity of parties involved in the transaction may be hidden such that only approved parties may validate and/or review recorded transactions. This may mandate a party to be present in a location and capture location specific and transaction specific advertisements. This may allow, for example, a party (e.g., customer or merchant) to realize the benefits of creating a transaction record on a public distributed ledger that is difficult, if not almost impossible, to tamper with, while maintaining the party's privacy.

Method and System for Blockchain and Verifiable Claim Based Transaction Provenance FIG. 1 is a diagram illustrating an example environment for proving and creating on a blockchain 800 a verifiable transaction record of a transaction between a user associated with user device 200 and an agent associated with agent system 300, where the identities of the user and agent are hidden, in accordance with implementations of the disclosure. FIG. 1 will be described in conjunction with FIGS. 2, 3, 4, 5, and 6 which are block diagrams respectively illustrating an example architecture of components of a location beacon 100, user device 200, agent system 300, off-chain verifier 400, and secure-identity verifier 500, in accordance with implementations of the disclosure. By way of example, the environment of FIG. 1 may be to prove and create a verifiable record of a purchase transaction between a customer and a merchant, where the customer exchanges funds from a bank account in exchange for a product. In such an example, user device 200 may comprise a mobile device (e.g., smartphone) of the customer, agent system 300 may comprise a point of sale (POS) terminal of the merchant, off-chain verifier 400 may be a server system of an off-chain banking authority, and secured identity verifier 500 may be a server of a central banking authority.

In the example of FIG. 1, a verifiable record of the transaction is created on a blockchain 800, copies of which may be maintained by nodes on blockchain network 700. As further described below, to maintain the privacy of the transacting user and agent, the record of the transaction on blockchain 800 may use secured representations of blockchain address (e.g., random numbers) to mask the identities of the transacting parties, the location of the transaction, and other transaction details.

Blockchain network 700 may be a public blockchain network or consortium blockchain network. In particular implementations, blockchain network 700 may be implemented as a consortium of banks, merchants, and customers that operate the blockchain for applications such as verifying and proving transactions between customers (e.g. user of user device 200) and merchants (e.g., merchant associated with agent system 300), and for creating distributed attestations of transactions. Blockchain network 700 may include a plurality of nodes (e.g., user device 200, agent system 300, secured identity verifier 500, and other components as needed depending on the type of blockchain implementation) that may read, write and/or validate transactions. Some or all blockchain nodes may store a respective copy of a blockchain 800 that contains a record of transactions, including blockchain transactions that include references to off-chain transactions made between user devices 200 and agent systems 300. In some implementations, nodes on blockchain network 700 (e.g. user device 200) may be able to read transactions, but not write and/or verify transactions. Although the example of FIG. 1 illustrates a blockchain 800 implemented as a linked-list of linear blocks, it should be appreciated that the systems and methods described herein may be implemented with any other distributed ledger.

Communications between client device 200, agent system 300, off-chain verifier 400, secured identity verifier 500, blockchain address mapping server system 600, and/or blockchain network 700 may occur over any suitable communication medium. Some non-limiting examples of communication mediums over which communications may occur include, for example: wired communications mediums, such as cable, fiber-optic, or DSL; wireless communications mediums, such as Wi-Fi®, cellular communications, or satellite communications; or some combination thereof. One or more access points (APs) may enable communications. An AP may refer to an access network node that can be used by an electronic device to gain access to a network. An AP may be part of a wireless network (e.g., a Wi-Fi® network). An AP may refer to a Wide Area Network) WAN or Low Power Wide Area Network (LP-WAN) base station or transmission system base station, another low power long range access network (e.g., LORA and SIGFOX) node, or an access node of a cellular network. An AP 276 may include a bridge, switch or router (or multiple switches/routers) to allow for communication between different devices.

A location beacon device 100 is configured to transmit (e.g., broadcast) a beacon including a secured representation of a location's blockchain address (e.g., RN-L1). In particular, each location beacon device 100 may be provisioned with a blockchain address 113 that is associated with a particular location in the real world from which the location beacon device 100 transmits beacons. To this end, each location beacon device 100 may remain fixed to the location corresponding to its provisioned blockchain address 113.

For example, a provisioned blockchain address 113 may be used to identify a pair of longitudinal and latitudinal coordinates, a specific indoor location (e.g., a store or purchase terminal location), a specific outdoor location, an object having a fixed and known location, etc. In some implementations, the location may comprise a geographical area or range from which signals may be received from the location beacon device 100 (e.g., before signal attenuation). A mapping between each provisioned blockchain address 113 and its associated location may be maintained by a central entity such as a node on blockchain network 700 or a device that is off-chain. For example, a blockchain address mapping server system 600 may maintain a mapping between a provisioned location blockchain address and an associated location in a location blockchain address database 691. This mapping may be taken care of during the provisioning process. It should be noted that although a single location beacon device 100 is illustrated in the example of FIG. 1, in some implementations, the environment may have multiple location beacon devices 100.

By virtue of a location beacon 100 transmitting a secured representation of a location blockchain address, which is associated with a location, information broadcast by a location beacon 100 may be secured from exposure and tampering from unauthorized entities. The beacons used may prevent tampering, preventing external parties from making any malicious changes in content, location, or operation, or copying information from the beacon. For example, when interactions using a blockchain address as an identifier of location occur in the open, passive sniffers or other attacking devices may be able to gather location information belonging to an organization, but the advertisements being one time advertisements are of no use after a particular short time period.

Each location beacon device 100 may include a machine readable medium 110, a processing device 120, and a transmitter 130. The transmitter 130 of location beacon device 100, in some implementations, may utilize a short-range transmission technology such as Bluetooth®, Bluetooth® Low Energy (BLE), radio-frequency identification (RFID), Wi-Fi®, Near-Field Communication (NFC), Zigbee, and the like. In other implementations, the location device 100 may utilize other transmission technologies such as cellular transmission, satellite transmission, LORA, SIGFOX, etc.

The machine readable medium 110 may store the location beacon device's blockchain address 113, and a public key 111 and private key 112 corresponding to the location blockchain address 113. For example, a private key 112 may be generated while creating a blockchain account, a public key 111 may be derived from the private key, and a blockchain address 113 may be derived from the public key 111 by applying additional cryptographic algorithm(s). In some implementations, public key 111 and location blockchain address 113 are the same, in which case machine readable medium 110 may store private key 112 and blockchain address 113. Location beacon device 100 may be provisioned with public key 111 (if different from blockchain address 113) and private key 112 during configuration of location beacon device 100. Some deployments may not require the private key to be provisioned to the location beacon device, and in such cases it may just have the public key, the blockchain address, and/or an ID as a reference to the blockchain address.

Each location beacon device 100 may include time-based hash generation instructions 114 that, when executed by processing device 120, apply a time-based cryptographic hashing algorithm to location blockchain address 113 to generate a secured representation of the location blockchain address. The secured representation of the location blockchain address may be generated by applying a one-time cryptographic hashing algorithm using a current timestamp and the location blockchain address. The current timestamp may be obtained from processing device 120 (e.g., from a clock of the processing device). A suitable time-based, hash-based message authentication code (HMAC) algorithm may be utilized to generate the secured representation of the blockchain address. As illustrated in the example of FIG. 1, application of one-time cryptographic hashing algorithm generates a beacon including a time-based one time random number (RN-L1) including the secured representation of the location blockchain address provisioned in beacon device.

In some implementations, a location beacon device 100 may be implemented as a one-way communication device that broadcasts TOTAs. For example, a location beacon device 100 may be implemented as a one-way Bluetooth® beacon transmitter.

Although location beacon device 100 is illustrated in FIG. 1 as transmitting beacons using radio frequency (RF) waves, it should be appreciated that, in some implementations, a location beacon device 100 may transmit a beacon using some other communication method such as a wired communication method (e.g., over coaxial and/or optical cables), a free space optical communication method (e.g., infrared, visible laser, etc.), or in a modulated soundwave (e.g., audible, subsonic, ultrasonic, etc.).

In an alternative implementation, a location beacon device 100 may instead be implemented as a device that displays data that is scanned to obtain a secured representation of its provisioned location blockchain address. For example, a location beacon device 100 may display a QR code or other barcode including an embedded secured representation of the location blockchain address, and a user device 200, may scan the QR code (e.g., using a camera) to receive the secured representation of the location blockchain address. In such implementations, the secured representation of the location blockchain address embedded in the QR code may periodically change (e.g., depending on a configured time of the time-based hashing algorithm).

In another implementation, rather than having a location beacon device 100 that broadcasts a secured representation of a blockchain address or displays a secured representation of a blockchain address, a fixed advertisement having a secured representation of a location blockchain address may be scanned (e.g., by server provider system 300) to obtain a secured representation of a location blockchain addresses. As used throughout the disclosure, the term "scanning" may generally refer to using any suitable scanning technique to read a value, including video or image capture, infrared light capture, laser capture, manual data entry of a value, ultrasonic or subsonic scanning techniques, manual data entry, RFID-based scanning, scanning a 2D/3D barcode, using a wired technology to scan, etc.

In some implementations, location beacon device 100 may be configured to broadcast two different secured representations of the location blockchain address at a time. For example, location beacon device 100 may generate a first secured representation of the location blockchain address at a first time and a second secured representation of the location blockchain address at a second time after the first time, and transmit a beacon including both secured representations of the location blockchain address.

A user of user device 200 is configured to conduct an off-chain transaction with agent system 300 and approve the off-chain transaction. For example, the user may be a customer or other party providing payment or some other consideration in exchange for a good or service. In some cases, the off-chain transaction may be conducted using user device 200. Additionally, as further described below, user device 200 may be configured to communicate with agent system 300 to generate a transaction record on blockchain 800 including a reference to the off-chain transaction, a secured representation of the blockchain address of the user, a secured representation of the blockchain address of the agent, and other data.

User device 200 may be a mobile device such as a smartphone, tablet, or notebook computer, a wearable device (e.g., smartwatch), a desktop computer, gaming console, smart speaker, or any other type of device that may be configured to approve a blockchain transaction including a reference to an off-chain transaction made between the user of user device 200 and system 300. User device 200 may include a machine readable medium 210, a processing device 220, a display 230, a receiver 240, and transmitter 250.

Receiver 240 and transmitter 250 may be configured to receive or transmit communications from/to agent system 300 and blockchain network 700 during a process of creating and approving an off-chain transaction and/or a blockchain transaction including a reference to the off-chain transaction. In implementations, receiver 240 and transmitter 250 may comprise multiple receivers and/or transmitters. For example receiver 240 and transmitter 250 may be implemented using Bluetooth® communication technology, NFC communication technology, cellular communication technology, Wi-Fi® communication technology, and/or some combination thereof. It should be appreciated that although receiver 240 and transmitter 250 are illustrated as being separate devices, in some implementations they may be implemented as a transceiver.

Machine readable medium 210 of user device 200 may include a blockchain wallet 211, blockchain application 215, and off-chain wallet 218. The blockchain wallet 211 may store the user's blockchain address 212, and a public key 214 and private key 213 corresponding to the user's blockchain address 212. For example, a public key 214 may be derived from the private key 213, and the user's blockchain address 212 may be derived from the public key 214 by applying additional cryptographic algorithm(s). In some implementations, public key 214 and blockchain address 212 are the same, in which case machine readable medium 210 may store private key 213 and blockchain address 212. In some implementations, blockchain wallet 211 may be a subcomponent of blockchain application 215.

Blockchain application 215 may be provided by a party associated with agent system 300, off-chain verifier 400, or secured identify verifier 500. For example, a retail store (agent) or a bank (verifier) may provide the blockchain application 315 through an online decentralized app store or other suitable medium. Alternatively, blockchain application 215 may be a native application of user device 200.

User device 200 may utilize blockchain application 215 to interact with agent system 300 and blockchain network 700 during a process of creating a blockchain transaction record that includes a reference to an off-chain transaction made between the user of user device 200 and agent system 300, secured representations of blockchain addresses of the user and agent, and/or a secured representation of a location blockchain address. To this end, blockchain application 215 may include approve blockchain transaction instructions 217 that may be executed by a processing device 200. Additionally, blockchain application 215 may include time-based hash generation instructions 216, which may be a subcomponent of instructions 217.

Time-based hash generation instructions 216, when executed by processing device 220, apply a time-based cryptographic hashing algorithm to user blockchain address 212 to generate a secured representation of the user blockchain address. The secured representation of the user's blockchain address may be generated in substantially the same manner as described above with reference to location beacon device 100. For example, the secured representation of the user's blockchain address may be generated by applying a one-time cryptographic hashing algorithm using a current timestamp and the user's blockchain address. The current timestamp may be obtained from processing device 220 (e.g., from a clock of the processing device). In some implementations, the user device 200 may use the same time-based cryptographic hashing algorithm as a beacon device 100. In other implementations, a different time-based cryptographic hashing algorithm may be used. In some implementations, time-based hash generation instructions 216 may iterate to generate secured representations of the blockchain address of user of user device 200, independent of whether a transaction occurs between the user device 200 and agent system 300.

By virtue of user device 200 transmitting a secured representation of the user's blockchain address, which may be associated with an individual such as a purchaser, personal information may be secured from exposure and tampering from unauthorized entities. In particular, a transaction record may be created on a public or consortium blockchain that hides the identity of the user from unauthorized parties. In some implementations, for added security, an encrypted user blockchain address 212 is stored in machine readable medium 210 of the user device 200. In such implementations, the encrypted user blockchain address 212 is decrypted prior to applying the time-based cryptographic hashing function to produce the secured representation of the blockchain address.

The off-chain wallet 218 may include tokenized card data 219 that may be presented by the user device 200 during an off-chain transaction with agent system 300. The tokenized card data may be associated with a bank card issued by a banking authority or other entity, such as an authority associated with off-chain verifier 400. For example, the tokenized card data may correspond to a credit card, debit card, charge card, loyalty card, and/or other purchase related token that is used during an off-chain transaction.

Agent system 300 may be configured to generate an off-chain transaction ID from an off-chain transaction with a user, and write blockchain transactions to the blockchain network 700, where the written blockchain transactions may contain a reference to the off-chain transaction, and secured representations of blockchain addresses of the user, agent, and/or transaction location. Agent system 300 may be implemented as any distributed financial or value transaction system, including an automated teller machine (ATM), POS system, card reader, cash register, etc. A POS system may include a POS terminal, mobile POS system (e.g., mobile payment terminal), payment kiosk or any other POS system to process card payments. In implementations, the agent system may be a system associated with a service or goods provider.

Agent system 300 may include a machine readable medium 310, a processing device 320, a display 330, a receiver 340, a transmitter 350, and a card reader 360.

Receiver 340 and transmitter 350 may be configured to receive or transmit communications from/to user device 200, blockchain network 700, and off-chain verifier 400 during a process of creating and approving an off-chain transaction and/or a blockchain transaction including a reference to the off-chain transaction. Receiver 340 may also receive beacons broadcast by location beacon device 100. In implementations, receiver 340 and transmitter 350 may comprise multiple receivers and/or transmitters. For example receiver 340 and transmitter 350 may be implemented using Bluetooth® communication technology, NFC communication technology, cellular communication technology, Wi-Fi® communication technology, and/or some combination thereof. It should be appreciated that although receiver 340 and transmitter 350 are illustrated as being separate devices, in some implementations they may be implemented as a transceiver.

Machine readable medium 310 of agent system 300 may include an agent blockchain address 312, private key 313 and public key 314 corresponding to blockchain address 312, blockchain application 315, and instructions 318 to create and verify off-chain transactions. Create and verify off-chain transaction instructions 318, when executed by a processing device 320, may generate an off-chain transaction ID and other off-chain transaction information (e.g., timestamp, address, merchant ID, payment amount, identifier of exchanged good or service, etc.) In some implementations, create and verify off-chain transaction instructions 318 may be implemented within blockchain application 315.

Blockchain application 315 may be provided by a party associated with agent system 300, off-chain verifier 400, secured identify verifier 500, or by a consortium of users 200. For example, a retail store (agent) or a bank (verifier) may provide the blockchain application 315.

Agent system 300 may utilize blockchain application 315 to write transactions to blockchain network 700 that include: a reference to an off-chain transaction ID associated with an off-chain transaction between a user of user device 200 and agent system 300, a secured representation of the user blockchain address, a secured representation of the agent blockchain address, a secured representation of the agent location blockchain address, and/or other data. To this end, blockchain application 315 may include write blockchain transaction instructions 317 that may be executed by a processing device 320. Additionally, blockchain application 315 may include time-based hash generation instructions 316, which may be a subcomponent of instructions 317.

Time-based hash generation instructions 316, when executed by processing device 320, apply a time-based cryptographic hashing algorithm to user blockchain address 312 to generate a secured representation of the user blockchain address. The secured representation of the agent's blockchain address may be generated in substantially the same manner as described above with reference to location beacon device 100 and user device 200. By virtue of system 300 transmitting a secured representation of the agent's blockchain address, information of provider such as a merchant may be secured from exposure and tampering from unauthorized entities. In particular, a transaction record may be created on a public or consortium blockchain that hides the identity of the agent from unauthorized parties.

Card reader 360 may be configured to receive bank card data provided by a user of user device 200 (e.g., using a physical card or card data stored in a digital wallet). Card reader 360 may be implemented as a chip card reader, a magnetic stripe reader, RFID card reader, NFC card reader, or any other suitable card reader. In implementations the received card data may be encrypted, and/or card reader 360 may apply encryption for added security.

In some implementations, a location beacon device 100 may be integrated into agent system 300 (e.g., in case system 300 is fixed).

An off-chain verifier server system 400 (referred to herein as "off-chain verifier 400") may be configured to conduct digital transactions off-chain. When there is an agent looking to confirm validity of a transaction, it may determine if a transaction associated with transaction ID shared by the agent has succeeded (e.g., sufficient funds available for transaction and transaction approved by user), and it may also trigger a request to the secured identity verifier 500 to confirm if a blockchain identity claimed by the user is valid. For example, to confirm the distributed identity of a user, the bank may check with a secured identity validator (e.g., central bank). This validation based on TOTAs of the user may provide a secondary validation of a transaction and prevent any spoofing or card theft or identity theft based spurious transactions.

The off-chain verifier 400 may check i) if an off-chain transaction user and on-chain transaction user are the same; ii) if the location of origination of a transaction and the registered location of the agent in its records are the same; iii) if the location of the transaction is not violating any regulations or policies; and/or iv) if the user is eligible for any discounts or royalty points or other benefits based on the location, agent, or purchase.

Off-chain verifier 400 may include a machine readable medium 410, processing device 420, and network interface 430. Machine readable medium 410 may store instructions 411, that when executed by a processing device 420, query a secured identity verifier 500 to verify a blockchain transaction including secured representations of blockchain addresses of two transacting parties (e.g., user and agent), and, in some implementations, a secured representation of a location blockchain address. Further, machine readable medium 410 may store instructions 412, that when executed by a processing device 420, verify an off-chain transaction. Additionally, machine readable medium 410 may store instructions 413, that when executed by a processing device 420, cause off-chain verifier 400 to issue payment to an agent from funds after attestation by secured identity verifier 500. This may provide for secondary verification of a transaction and faster settlement.

Network interface 430 may be configured to communicate with agent system 300, blockchain network 700, and/or secured identity verifier 500.

A secured identity verifier server system 500 (referred to herein as "secured identity verifier 500") may be configured to verify blockchain transactions and issue attestations to the blockchain network attesting to verified blockchain transactions. In particular, it may be configured to receive queries from the off-chain verifier 400 to validate the identity of the user, agent, and/or location of the transaction, and if they are valid. Secured identity verifier 500 may check the identity with the blockchain address mapping server system and validate the transaction on the blockchain. It may share the information with the off-chain verifier 400 after verification. Based on the attestation from the secured identity verifier 500, a bank may run business logics such as balance, location, agent, discounts and offers along with identity checks to confirm the transaction and make settlements on-chain or off-chain. In particular implementations, secured identity verifier server system 500 may be implemented as a server system of a central bank.

Secured identity verifier 500 may include a machine readable medium 510, processing device 520, and network interface 530. Machine readable medium 510 may store instructions 514, that when executed by a processing device 520, verify a blockchain transaction including secured representations of blockchain addresses of two transacting parties (e.g., user and agent), and, in some implementations, a secured representation of a location blockchain address. Additionally, machine readable medium 510 may store instructions 512, that when executed by a processing device 520, cause secured identity verifier 500 to sign (e.g., using private key 512) and write an attestation to the blockchain network 700 that attests to the verified transaction.

Network interface 530 may be configured to communicate with off-chain verifier 400 and/or blockchain network 700. Network interface 530 may also be configured communicate with a blockchain address mapping server system 600, which as further described below, is configured to maintain a mapping between clear and secured representations of blockchain address (e.g., blockchain addresses associated with location beacon devices 100, user devices 200, and agent systems 300). Although blockchain address mapping server system 600 is illustrated in the example of FIG. 1 as being separate from secured identity verifier 500, in some implementations blockchain address mapping server system 600 may be integrated into verifier 500.

Figure 7:
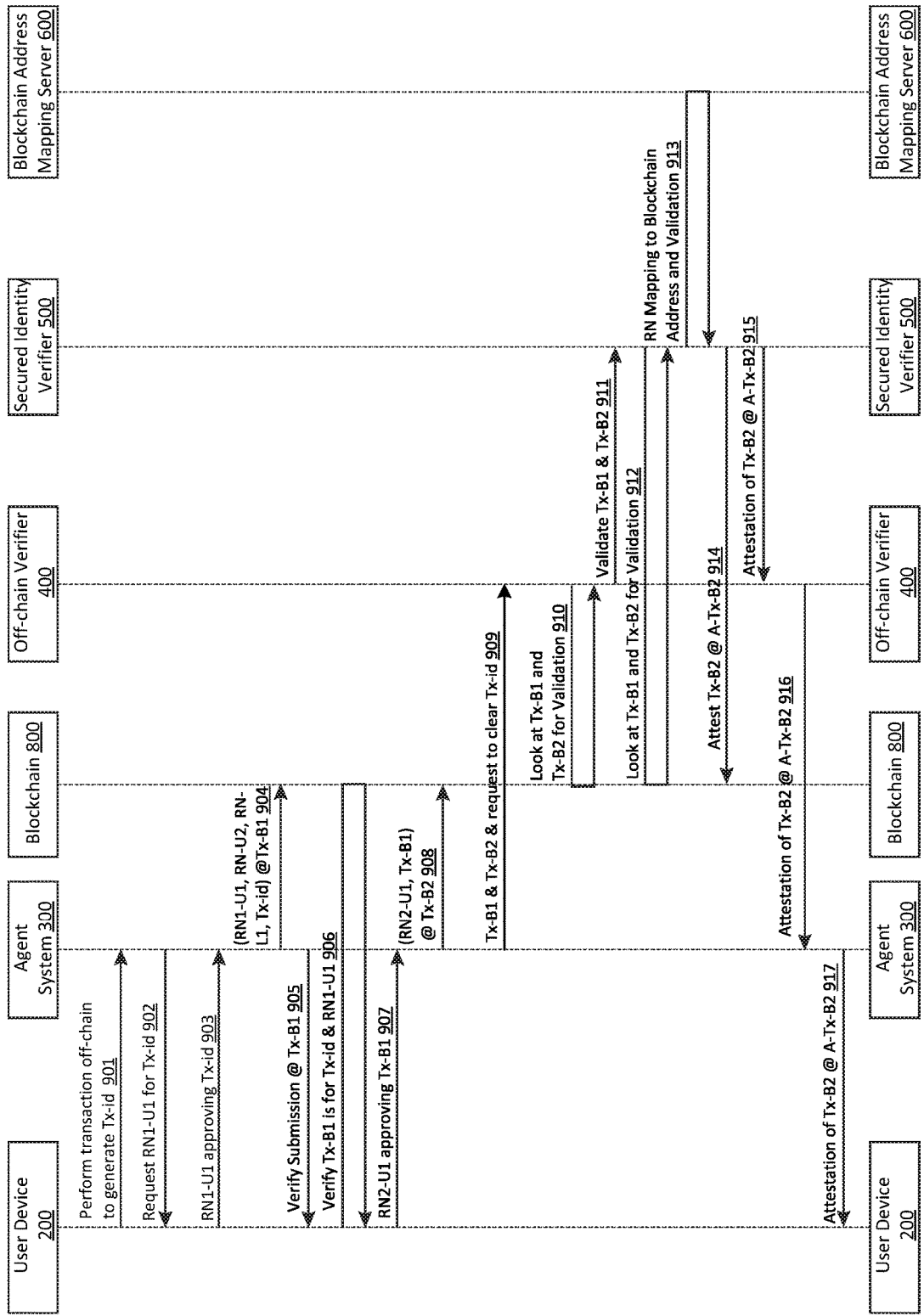
FIG. 7 is a sequence diagram illustrating a particular example method that may be implemented in the environment of FIG. 1 to create a verifiable blockchain transaction record of a transaction between a user associated with user device and an agent associated with an agent system, where the identities of the user and agent are hidden, in accordance with implementations of the disclosure.

FIG. 7 is a sequence diagram illustrating a particular example method that may be implemented in the environment of FIG. 1 to create verifiable blockchain transaction record of a transaction between a user associated with user device 200 and an agent associated with agent system 300, where the identities of the user and agent are hidden, in accordance with implementations of the disclosure. The steps 901-917 of the sequence diagram will be referenced by way of example when discussing FIGS. 8, 9, 10, which illustrate example methods that may respectively be implemented by each of user device 200, agent 300, and off-chain verifier 400/secured identity verifier 500.

Figure 8:
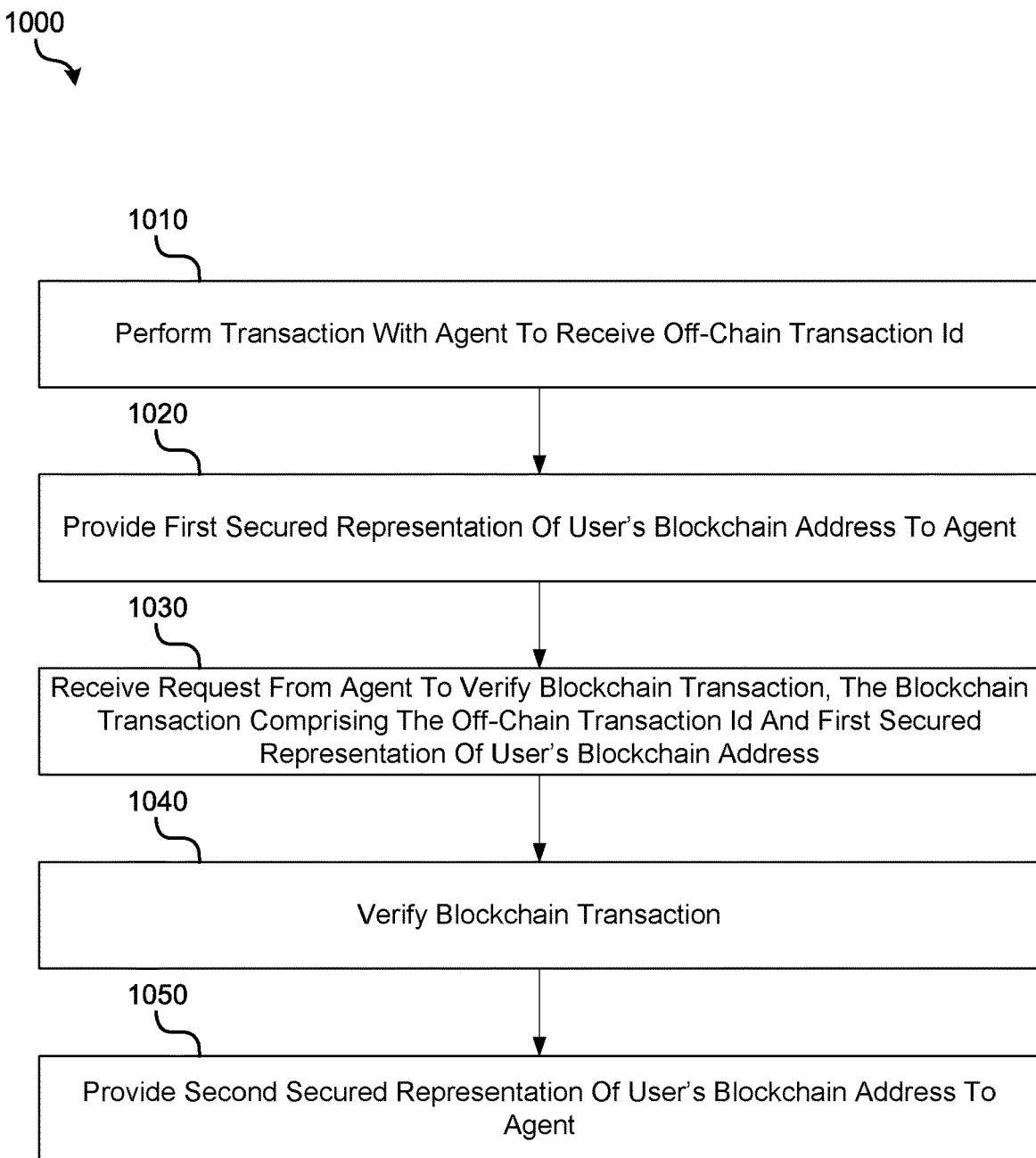
FIG. 8 is an operational flow diagram illustrating an example method that may be implemented by a user of user device, in accordance with implementations of the disclosure.

FIG. 8 is an operational flow diagram illustrating an example method 1000 that may be implemented by a user of user device 200, in accordance with implementations of the disclosure. Some or all of the operations of method 1000 may be implemented by a processing device 220 executing time-based hash generation instructions 216 and approve blockchain transaction instructions 217.

At operation 1010, the user performs a transaction with the agent to receive an off-chain transaction ID. For example, as illustrated by step 901 of FIG. 7, user device 200 may perform an off-chain transaction with agent system 300 that generates Tx-id. An off-chain transaction ID may be a receipt number, an order number, bank transaction number, or any other identifier of an off-chain transaction between the user and agent for a good and/or service. The off-chain transaction ID may be generated by the agent system 300 and provided to the user device 200.

In some implementations, the user provides bank card data during the off-chain transaction. For example, a chip card reader, a magnetic stripe reader, an RFID reader, an NFC device, or other suitable mechanism may be used by agent system 300 to obtain bank card data associated with a bank card issued to the user. In particular implementations, user device 200 may provide tokenized card data 219 during the off-chain transaction. For example, the user device 200 may utilize NFC to communicate tokenized card data 219 to a card reader 360 of agent system 300.

In some implementations, the user may be remotely located from the agent. For example, the user may be shopping for a product or service offered by the agent over the internet, and the user may populate a form provided over a web portal with bank card data. After submitting the order including the populated web form, an off-chain transaction ID may be generated.

At operation 1020, after the transaction ID is generated, the user device 200 provides a first secured representation of the user's blockchain address to the agent system 300. For example, as illustrated by step 903 of FIG. 7, user device 200 provides RN1-U1 to agent system 300 approving the transaction. The first secured representation of the blockchain address may be provided in response to receiving the off-chain transaction ID from agent system 300, and it may signal an approval of the transaction associated with the off-chain transaction ID. A processing device 220 may execute time-based hash generation instructions 216 to generate the first secured representation of the user's blockchain address. In some implementation, the secured representation of the blockchain address may already have been generated (e.g., the blockchain application may run in the background even when a transaction is not made).

At operation 1030, the user device 200 receives a request from the agent system 300 to verify a blockchain transaction including the off-chain transaction ID and the first secured representation of the user's blockchain address. In some implementations, the blockchain transaction may also include a secured representation of the agent's blockchain address and/or a secured representation of a location blockchain address of a location where the transaction took place. In implementations, the request to verify the blockchain transaction includes a blockchain transaction identifier (ID) of a transaction stored on blockchain 800 of blockchain network 700. For example, as illustrated by step 905 of FIG. 7, user device 200 may receive a request to verify a first blockchain transaction Tx-B1, where the first blockchain transaction includes the first secured representation of the user blockchain address (RN1-U1), a secured representation of the blockchain address of agent system 300 (RN1-U2), a secured representation of a location blockchain address (RN-L1), and the off-chain transaction ID (Tx-id).

At operation 1040, the user device 200 verifies the blockchain transaction. In implementations, the user device 200 may look up the blockchain transaction associated with a blockchain transaction ID provided by the agent system 300. The user device 200 may verify the blockchain transaction by confirming that the blockchain transaction includes the off-chain transaction ID and the first secured representation of the blockchain address of the user. For example, as illustrated by step 906 of FIG. 7, user device 200 may verify that first blockchain transaction Tx-B1 includes Tx-id and RN1-U1. By virtue of independently verifying the blockchain transaction on the blockchain, the user device 200 may confirm that the secured representation of the user blockchain address was associated with the correct off-chain transaction.

At operation 1050, after verifying the blockchain transaction, the user device 200 provides a second secured representation of the user blockchain address to the server provider system 300. The second secured representation of the user blockchain address may signal approval of the blockchain transaction. For example, as illustrated by step 907 of FIG. 7, the user device 200 may provide RN2-U1, which signals approval of Tx-B1. The second secured representation of the user blockchain address may be generated by user device 200 at some time after the first secured representation of the user blockchain address was generated (e.g., a time sufficient to change a one-time value generated by time-based hashing). It may be generated in response to verifying the blockchain transaction, or it may be a value that was already generated beforehand (e.g., by iteratively executing time-based hash generation instructions).

In response to providing the second secured representation of the user blockchain address, and after further verification on the backend, user device 200 may receive a message from the agent system 300 of a distributed attestation transaction. The distributed attestation transaction may attest to the truth of a second blockchain transaction including the second secured representation of the user blockchain address and a reference (e.g. blockchain transaction ID) to the blockchain transaction verified by the user device at operation 1040. For example, as illustrated by FIG. 7, at step 917, agent system 300 may receive distributed attestation transaction A-Tx-B2 that attests to Tx-B2.

Figure 9:
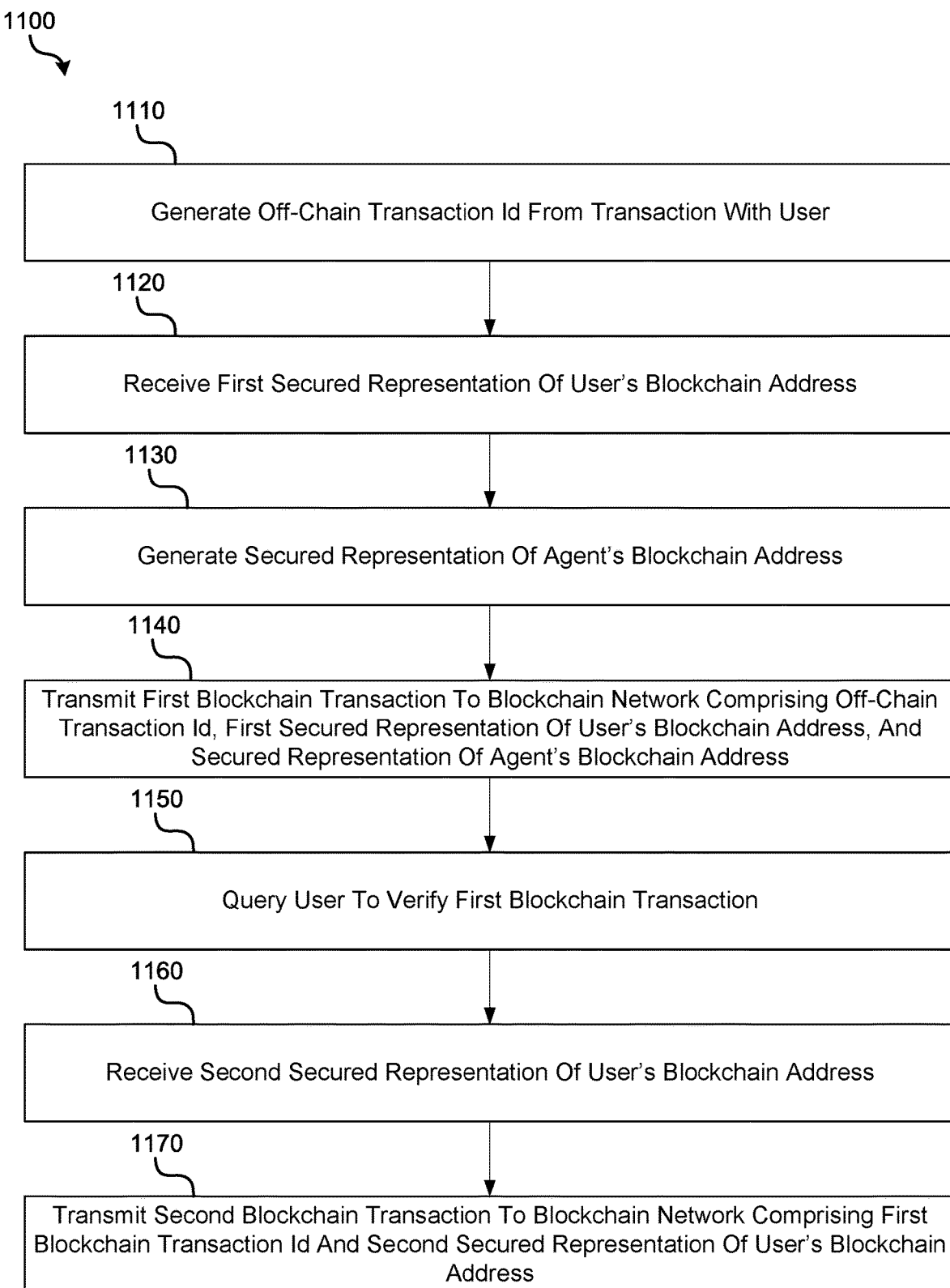
FIG. 9 is an operational flow diagram illustrating an example method that may be implemented by agent system, in accordance with implementations of the disclosure.

FIG. 9 is an operational flow diagram illustrating an example method 1100 that may be implemented by agent system 300, in accordance with implementations of the disclosure. Some or all of the operations of method 1100 may be implemented by a processing device 320 executing time-based hash generation instructions 316 and write and prove blockchain transaction instructions 317.

At operation 1110, agent system 300 generates an off-chain transaction ID by conducting an off-chain transaction with a user. For example, a user may provide bank card data to initiate payment in exchange for a good or service. In the case of cash payment, for example, the off-chain transaction ID may be generated by the billing system of a merchant.

After generating the off-chain transaction ID, agent system 300 may transmit it to a user device 200 associated with the user. At operation 1120, the agent system 300 receives a first secured representation of the user's blockchain address from user device 200. The received first secured representation of the blockchain address may indicate an approval of the off-chain transaction, and may be provided by the user in response to a request from agent system 300. For example, as illustrated by FIG. 7, at step 902, agent system 300 requests RN1-U1.

At operation 1130, the agent system 300 generates a secured representation of the agent's blockchain address. A processing device 320 may execute time-based hash generation instructions 316 to generate the secured representation of the agent's blockchain address.

At operation 1140, the agent system 300 transmits, to blockchain network 700, a first blockchain transaction that comprises the off-chain transaction ID, the first secured representation of the user's blockchain address, and the secured representation of the agent's blockchain addresses. In some implementations, the transmitted blockchain transaction may also include a secured representation of a location blockchain address associated with a location. For example, as illustrated by FIG. 7, at step 904, agent system 300 writes a first block transaction Tx-B1 to blockchain 800 that contains RN1-U1, RN-U2, RN-L1, Tx-id. The agent system 300 may sign the first blockchain transaction using its private key 313 prior to transmission of the first blockchain transaction to the blockchain network 700.

Prior to operation 1140, agent system 300 may obtain the secured representation of the location blockchain address from a beacon transmitted by a location beacon device 100. Alternatively, agent system 300 may scan a fixed advertisement including the secured representation of the location blockchain address or obtain the secured representation of the location blockchain address in some other manner as discussed above.

By virtue of writing a transaction to the blockchain network that includes secured representations of the user blockchain address, agent blockchain address, and, in some instances, a location blockchain address associated with a location where the transaction occurred, a record of the parties involved in a transaction, as well as the place of the transaction, may be maintained on the blockchain that is viewable by any member of the consortium (or public, in the case of a public blockchain), but only understandable by permissioned nodes (e.g., secured identity verifier 500). Stated another way, the blockchain transaction record protects the identities of the involved parties as non-permissioned nodes will not be able to understand the random numbers generated by independent bodies or off-chain transaction ID that has no meaning to non-parties to the off-chain transaction.

The blockchain transaction transmitted to the blockchain network 700 may be validated by nodes on the blockchain network 700 using some suitable consensus mechanism. By way of example, a signed blockchain transaction may be broadcast by agent system 300 to all or a subset of nodes on blockchain network 700. Thereafter, the nodes of blockchain network 700 may come to a consensus that validates the transaction and update the blockchain 800 with a block or a distributed ledger entry including the validated transaction.

At operation 1150, the agent system 300 queries the user device 200 to verify the first blockchain transaction. In implementations, the query may include a blockchain transaction ID of the first blockchain transaction that may be used by the user device 200 to look up the blockchain transaction after it has been validated by the blockchain network 700.

At operation 1160, in response to the query, the agent system 300 receives a second secured representation of the user's blockchain address. At operation 1170, the agent system 300 transmits, to blockchain network 700, a second blockchain transaction that comprises a reference to the first blockchain transaction (e.g., the first blockchain transaction ID) and the second secured representation of the user blockchain address received from user device 200. For example, as illustrated by FIG. 7, at step 908, agent system 300 writes a second block transaction Tx-B2 to blockchain 800 that contains RN2-U1 and Tx-B1. In implementations, device 300 may sign the second blockchain transaction with its private key.

Thereafter, system 300 may share the first and second blockchain transaction IDs (e.g., Tx-B1 and Tx-B2) with off-chain verifier 400, and request validation. For example, in the case of agent system 300 belonging to a merchant, the merchant may request that the bank (e.g., associated with off-chain verifier 400) clear the transaction and pay the merchant from the user's account. After validation, agent system 300 may receive a reference to a distributed attestation verifying the second blockchain transaction. For example, as illustrated by FIG. 7, at step 916, agent system 300 may receive distributed attestation transaction A-Tx-B2 that attests to Tx-B2. The attestation of Tx-B2 may provide a chain of validation that attests that all of Tx-B2, Tx-B1 and Tx-id are valid transactions between the parties (user and agent) at an approved location, as Tx-B2 references Tx-B1 and Tx-B1 references Tx-id.

Figure 10:
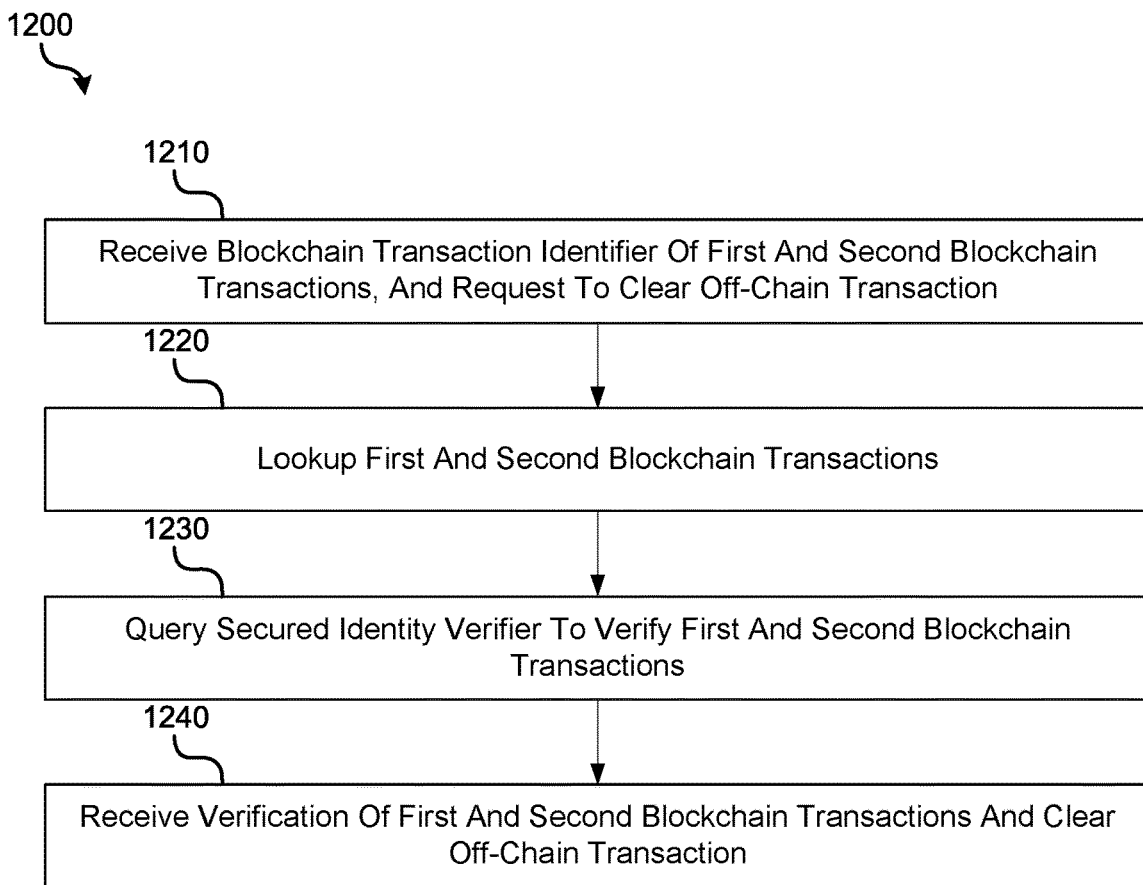
FIG. 10 is an operational flow diagram illustrating an example method that may be implemented by an off-chain verifier, in accordance with implementations of the disclosure.

FIG. 10 is an operational flow diagram illustrating an example method 1200 that may be implemented by off-chain verifier 400, in accordance with implementations of the disclosure. Some or all of the operations of method 1200 may be implemented by a processing device 420 executing instructions 411-413.

At operation 1210, off-chain verifier 400 receives from agent 300 a blockchain transaction ID of first and second blockchain transactions, and a request to clear an off-chain transaction. For example, as illustrated by FIG. 7, at step 909, off-chain verifier 400 receives Tx-B1 and Tx-B2 along with a request to clear Tx-id. The second blockchain transaction may include the blockchain transaction ID of the first blockchain transaction and a second secured representation of the blockchain address of the user. The first blockchain transaction may include off-chain transaction ID, the first secured representation of the user blockchain address, and a secured representation of the agent blockchain address. In some instances it may also include a secured representation of a blockchain address of the location of the transaction.

At operation 1220, off-chain verifier 400 looks up the first and second blockchain transactions. For example, as illustrated by FIG. 7, at step 910, off-chain verifier 400 looks up blockchain transactions Tx-B1 and Tx-B2 on blockchain 800.

At operation 1230, off-chain verifier 400 queries the secured identity verifier 500 to verify the first and second blockchain transactions. For example, the off-chain verifier 400 may send the first blockchain transaction ID and second blockchain transaction ID to secured identity verifier 500 to perform the validation. For example, as illustrated by FIG. 7, at step 911, off-chain verifier 400 queries secured identity verifier to valid Tx-B1 and Tx-B2. Thereafter, off-chain verifier 400 may be notified by verifier 500 that the first and second blockchain transactions have been verified.

Further, off-chain verifier 400 may verify the off-chain transaction. For example, in cases where off-chain verifier is associated with a bank of the user, it may determine that there are sufficient funds in the user's account to provide to the agent (e.g., merchant). Verification of the off-chain transaction may occur before or after operation 1230. In some cases, if the off-chain transaction is not verified (e.g., insufficient funds), operations 1220-1240 may not be performed. Verifier 400 may notify secured identity verifier 500 that the off-chain transaction has been verified. In some implementations, the off-chain verifier 400 may request that the secured identity verifier 500 determine if an off-chain ID of the user and first and second secured representations of the user belong to the same entity.

In implementations, after verification by secured identity verifier 500, off-chain verifier 400 may receive from secured identity verifier 500 a reference to a distributed attestation of the second blockchain transaction that is stored on the blockchain 800 of blockchain network. For example, as illustrated by FIG. 7, at step 915, off-chain verifier receives A-Tx-B2, which is an attestation of Tx-B2 recorded on the blockchain 800.

At operation 1240, off-chain verifier 400, may receive verification of the first and second blockchain transactions, and clear the off-chain transaction. For example, it may issue payment to the agent 300. It may also send a reference of the distributed attestation to the agent.

In some cases, the off-chain verifier may perform some additional checks for settlement such as comparing an approved location for the agent, discounts of the user, and loyalty points for the user. In these cases, in addition to the attestation, off-chain verifier 400 may look at other parameters to complete a settlement or other transaction. In these cases, the attestation address/identifier on the blockchain for an agent and a user transaction may be communicated by the off-chain validator to the corresponding agent. In certain implementations, the off-chain verifier 400 may send the attestation reference to both user and agent. In some implementations, if timely updates are not sent by an agent or off-chain verifier, a user may find the attestation by looking for a secured representation on the blockchain. The same may be done by the agent as well, removing any dependency on any single party of not communicating the attestation in a sequence, to allow for on-time updates.

Figure 11:
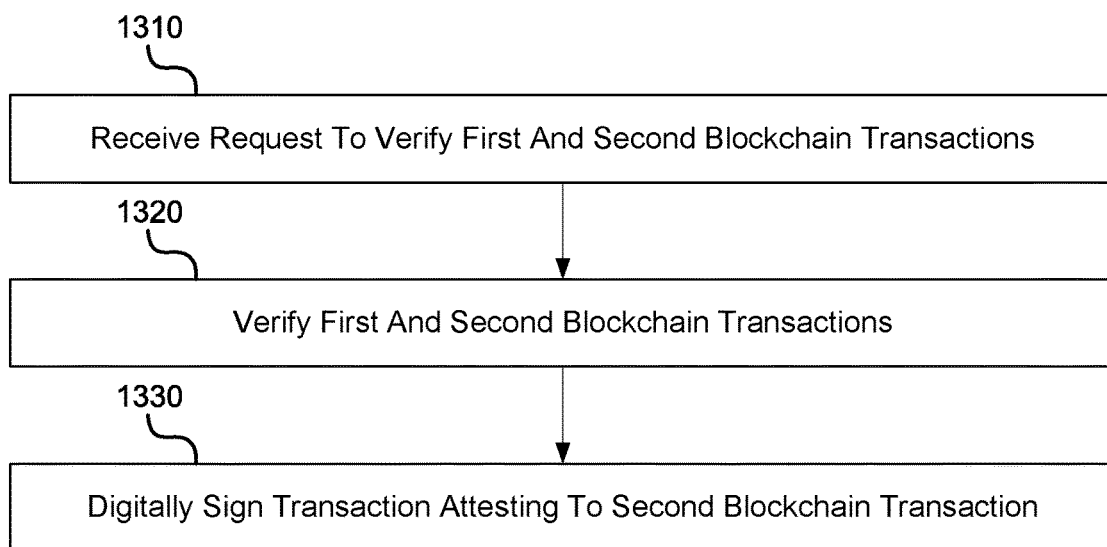
FIG. 11 is an operational flow diagram illustrating an example method that may be implemented by secured identity verifier, in accordance with implementations of the disclosure.

FIG. 11 is an operational flow diagram illustrating an example method 1300 that may be implemented by secured identity verifier 500, in accordance with implementations of the disclosure. Some or all of the operations of method 1300 may be implemented by a processing device 520 executing instructions 514-515.

At operation 1310, secured identity verifier 500 receives a request from off-chain verifier 400 to verify first and second blockchain transactions. In some implementations, the request may include an ID of each of the first and second blockchain transactions so that verifier 500 may look them up on the blockchain. For example, as illustrated by FIG. 7, at step 912, secured identity verifier looks up Tx-B1 and Tx-B2 for validation. The second blockchain transaction may include the blockchain transaction ID of the first blockchain transaction and a second secured representation of the blockchain address of the user. The first blockchain transaction may include the off-chain transaction ID, the first secured representation of the user blockchain address, and a secured representation of the agent blockchain address. In some instances it may also include a secured representation of a blockchain address of the location of the transaction.

At operation 1320 verifier 500 verifies the first and second blockchain transactions. In particular, central verifier server 500 may communicate with a blockchain address mapping server system 600 including a blockchain address database 691 and time-based hash generation instructions 692. The blockchain address database 691 may including mappings between blockchain addresses and their secured representations. In particular database 691 may be configured to maintain, over time, a mapping between user blockchain addresses and their respective secured representations, agent blockchain addresses and their respective secured representations, and/or location blockchain addresses and their respective secured representations. For example, database 691 may be used to map RN-L1 to the location blockchain address of device 100, RN1-U1 and RN2-U1 to the user blockchain address of device 200, and RN-U2 to the agent blockchain. In some implementations, separate blockchain address databases may be maintained for this purpose (e.g., one database for locations, one database for users that are customers, and one database for agents that are merchants). To create this mapping, system 600 may use time-based hash generations instructions 692 to generate the secured representation of the blockchain address. The instructions may apply the same time-based hashing algorithm that is applied at each user device, location beacon device, or agent system 300 to generate the same secured representation of the blockchain address. In some implementations, the mapping database may also provide mapping between off-chain account ids and on-chain blockchain addresses, if financial transactions are not carried out on-chain. This may help provide transitioning from traditional transactional systems to distributed value transactional systems.

As such, in response to a query received from off-chain verifier 400 to verify Tx-B1 & Tx-B2, central verifier server 500 may query system blockchain address mapping server system 600 to retrieve clear versions of the blockchain addresses and determines identities of the parties involved in the transaction and the location of the transaction. For example, as illustrated by FIG. 7, at step 913, verifier 500 may access server to perform RN mapping to blockchain addresses and validation. Based on the business case, the systems may decide if additional validation may be done at the secured identity validator or off-chain validator for checking additional conditions using a smart contract. This is optional and purely depends on the business case and how transparent the entities are sharing business logics. In some implementations both the secured identity verifier and off-chain verifiers may run additional smart contracts before signing attestation or doing further processing.

At operation 1330, secured verifier 500 digitally signs an attestation (e.g., using private key 512) attesting to the second blockchain transaction (which also validates/provides attestation for Tx-B1 and Tx-id as they are referenced in a chain) and transmits it to the blockchain network 700 to write to blockchain 800 to create a distributed attestation. For example, as illustrated by FIG. 7, at step 914, the attestation A-Tx-B2 attesting to Tx-B2 is written on blockchain 800. Thereafter, secured verifier 500 may communicate a blockchain transaction ID of the distributed attestation to off-chain verifier 400 (e.g. step 915).

In alternative implementations, verifier 400 may perform the verification of the first and second blockchain transactions itself (e.g., if customer and merchant use same bank). For example, it may have access to blockchain address mapping server system 600. In yet other implementations, both verifiers 400 and 500 may have access to blockchain address mapping server system 600, and perform the verification of the first and second blockchain addresses. In such implementations, both verifiers 400 and 500 may come to a consensus before an attestation is generated.

Method and System for Using Non-Advertised Random Number Based Hidden Identity for Verifiable Claims.

Referring again to the example of FIG. 7, after the user device 200 verifies the first blockchain transaction corresponding to Tx-B1 on the blockchain 800, the user device 200 sends a second secured representation of its blockchain address (e.g., RN2-U1) generated at a second time to agent 300. Agent 300 is then configured to write a second blockchain transaction Tx-B2 to the blockchain network 700, including both RN2-U1 and Tx-B1. However, if agent 300 were to associate RN1-U1 with another blockchain transaction (e.g., not Tx-B1), user device 200 may have no recourse to protest the invalid transaction involving user device 200 on the blockchain.

Figure 12:
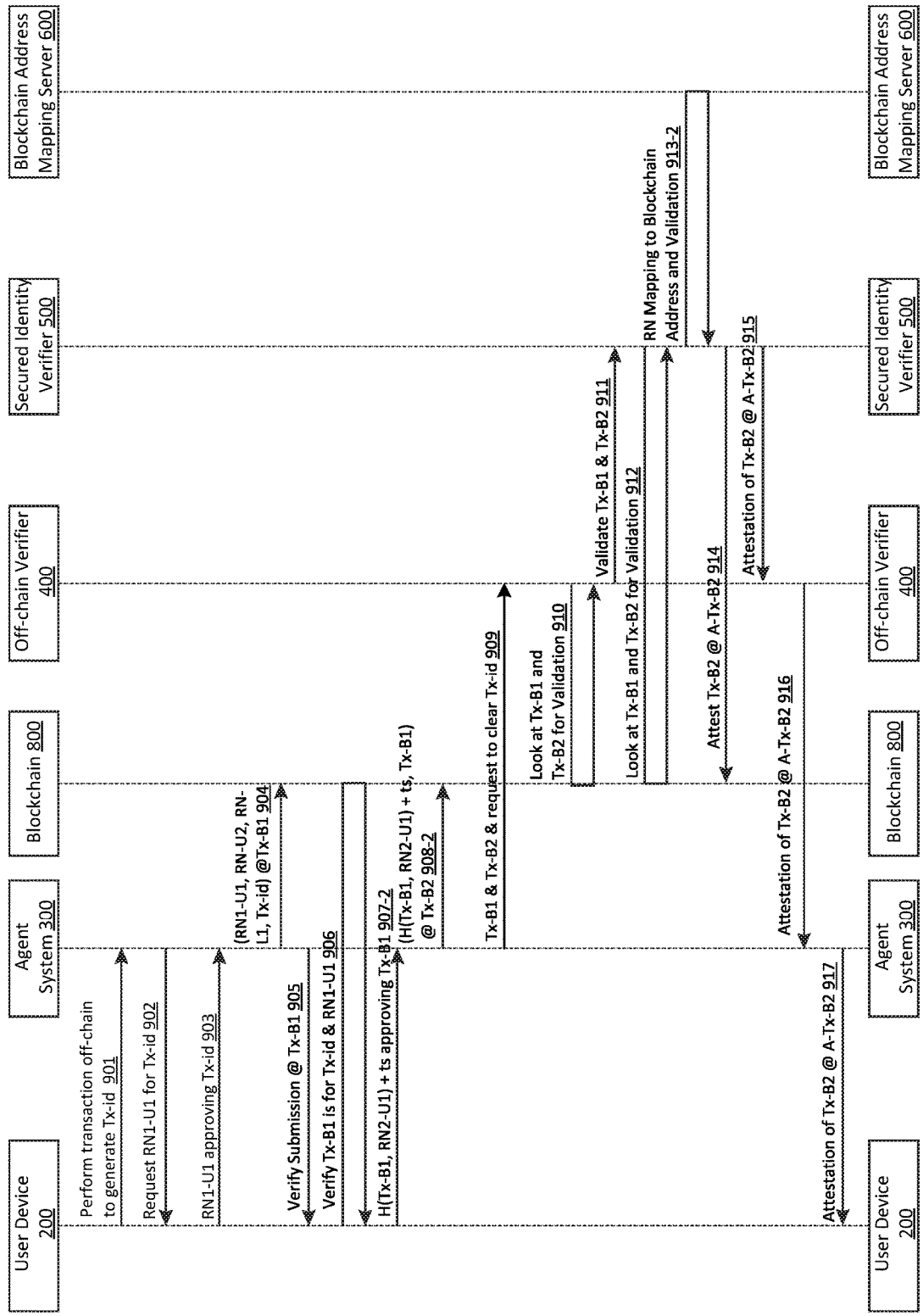
FIG. 12 illustrates one example sequence diagram illustrating a particular example method that may be implemented in the environment of FIG. 1 to mask the second secured representation of the user blockchain address and create a verifiable blockchain transaction record of a transaction between a user associated with a user device and an agent associated with an agent system, where the identities of the user and agent are hidden, in accordance with implementations of the disclosure.

To this end, in some implementations, the second secured representation of the blockchain address associated with the user device may be masked from agent 300. FIG. 12 illustrates one example sequence diagram illustrating a particular example method that may be implemented in the environment of FIG. 1 to mask the second secured representation of the user blockchain address and create verifiable blockchain transaction record of a transaction between a user associated with user device 200 and an agent associated with agent system 300, where the identities of the user and agent are hidden, in accordance with implementations of the disclosure.

In particular, as contrasted with the sequence diagram of FIG. 7, where user device returns RN2-U1 to agent system 300 (step 907) after verification of the first blockchain transaction, user device 200 may instead, at step 907-2, return a hash of Tx-B1 that uses RN2-U1 as a hashing key. In some implementations a timestamp (ts) is attached or otherwise included with the hash. This hash (and time stamp) may then be provided to the agent system 300, which includes it along with Tx-B1 in the second blockchain transaction that is written to the blockchain 800 (labeled herein as step 908-2). In some implementations, this hashing function may be transparent to verifier provider system 400, in which case system 400 may not have knowledge that the value returned at step 907-2 is a hash of Tx-B1 using RN2-U1, instead of RN2-U1 itself.

Secured identity verifier 500, which has access to blockchain address mapping server system 600, may determine the hash H(Tx-B1, RN2-U1). In particular, at step 913-2, RN-C2 may be retrieved from database 691, and Tx-B1 may be hashed using RN-C2 as a key. In implementations the correct key RN-C2 may be first generated by using a timestamp attached to the hash to generate RN-C2. That hash may be compared with the hash written at Tx-B2 to validate the second blockchain transaction. By virtue of this implementation, a user device 200 may hide its identity to the agent system 300 (e.g., merchant) while still allowing for validation of the transaction. The foregoing implementation may provide advantages such as: hidden identity for claims than can be centrally verified; hidden identity in combination with blockchain to create verifiable claims that are immutable; and hidden identity that can only by approved entities having access to central systems with the ability to map secured representations of blockchain addresses.

Figure 13:
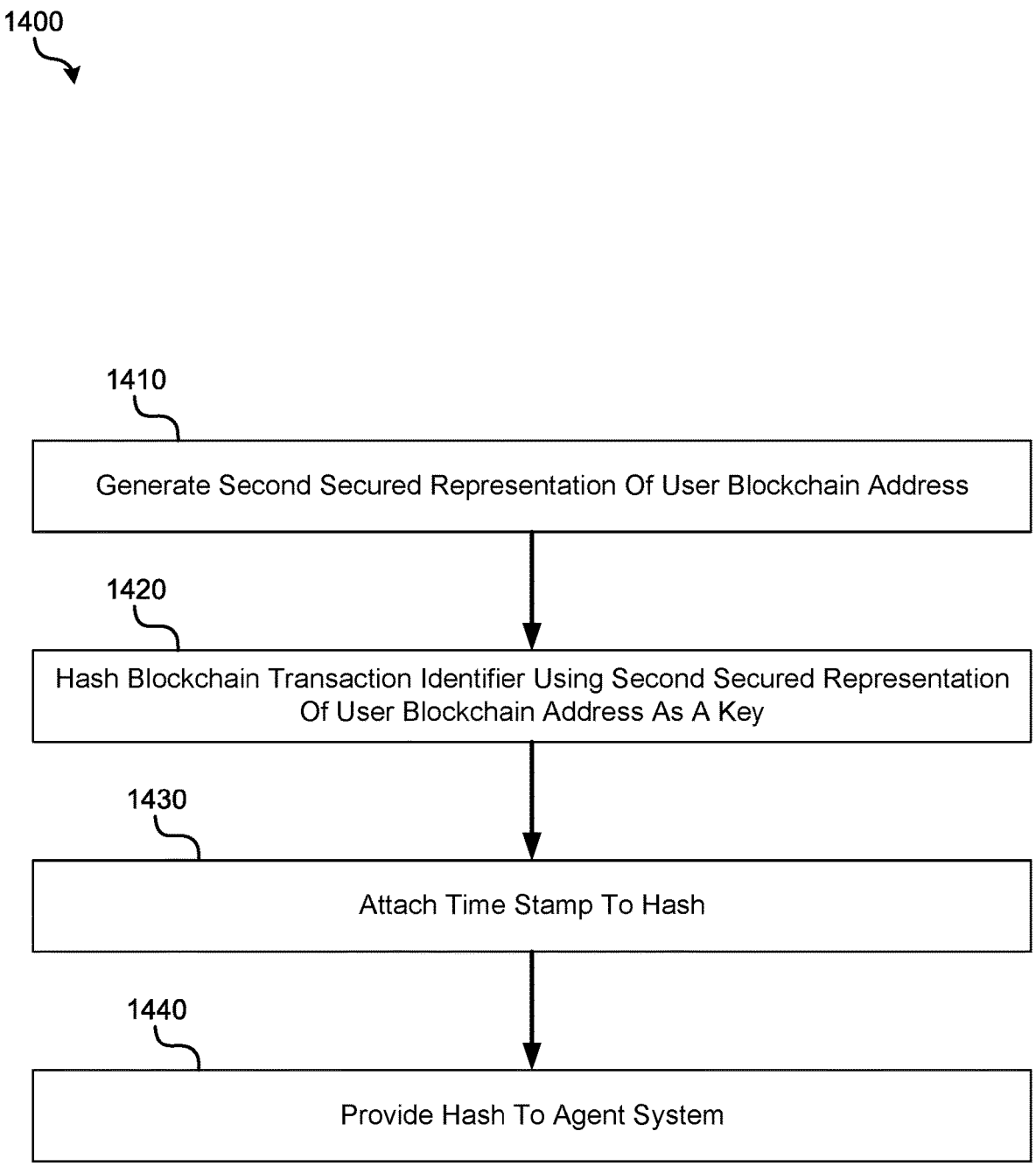
FIG. 13 is an operational flow diagram illustrating an example method that may be implemented by a user of a user device, in accordance with implementations of the disclosure.

FIG. 13 is an operational flow diagram illustrating an example method 1400 that may be implemented by a user of user device 200, in accordance with implementations of the disclosure. Some or all of the operations of method 1000 may be implemented by a processing device 220 executing instructions stored in a machine readable medium 210. In some implementations, prior to implementing method 1400, operations 1010 through 1040 may be performed as described above with reference to FIG. 8.

At operation 1410, the user device 200 generates a second secured representation of the user blockchain address. The second secured representation of the user blockchain address may be generated after verifying a blockchain transaction (e.g. operation 1040) looked up at an associated blockchain transaction ID and including a first secured representation of the user blockchain address and an off-chain transaction identifier of an off-chain transaction involving the user. The second secured representation of the user blockchain address may be generated by user device 200 at some time after the first secured representation of the user blockchain address was generated (e.g., a time sufficient to change a one-time value generated by time-based hashing). It may be generated in response to verifying a blockchain transaction, or it may be a value that was already generated beforehand (e.g., by iteratively executing time-based hash generation instructions).

At operation 1420, the user device hashes the blockchain transaction ID using the generated second secured representation of the user blockchain address as a key.

At operation 1430, a timestamp is attached or otherwise associated with the hash. The timestamp may be appended to the end of the hash. The timestamp may correspond to the time when the second secured representation of the user blockchain address was generated (i.e., the timestamp used to generate the second RN of the user).

At operation 1440, the hash and timestamp are provided to the agent system. The hash (and time stamp) may signal approval of the blockchain transaction. For example, as illustrated by step 907-2 of FIG. 12, the user device 200 may provide H(Tx-B1, RN2-U1), which signals approval of Tx-B1.

Figure 14:
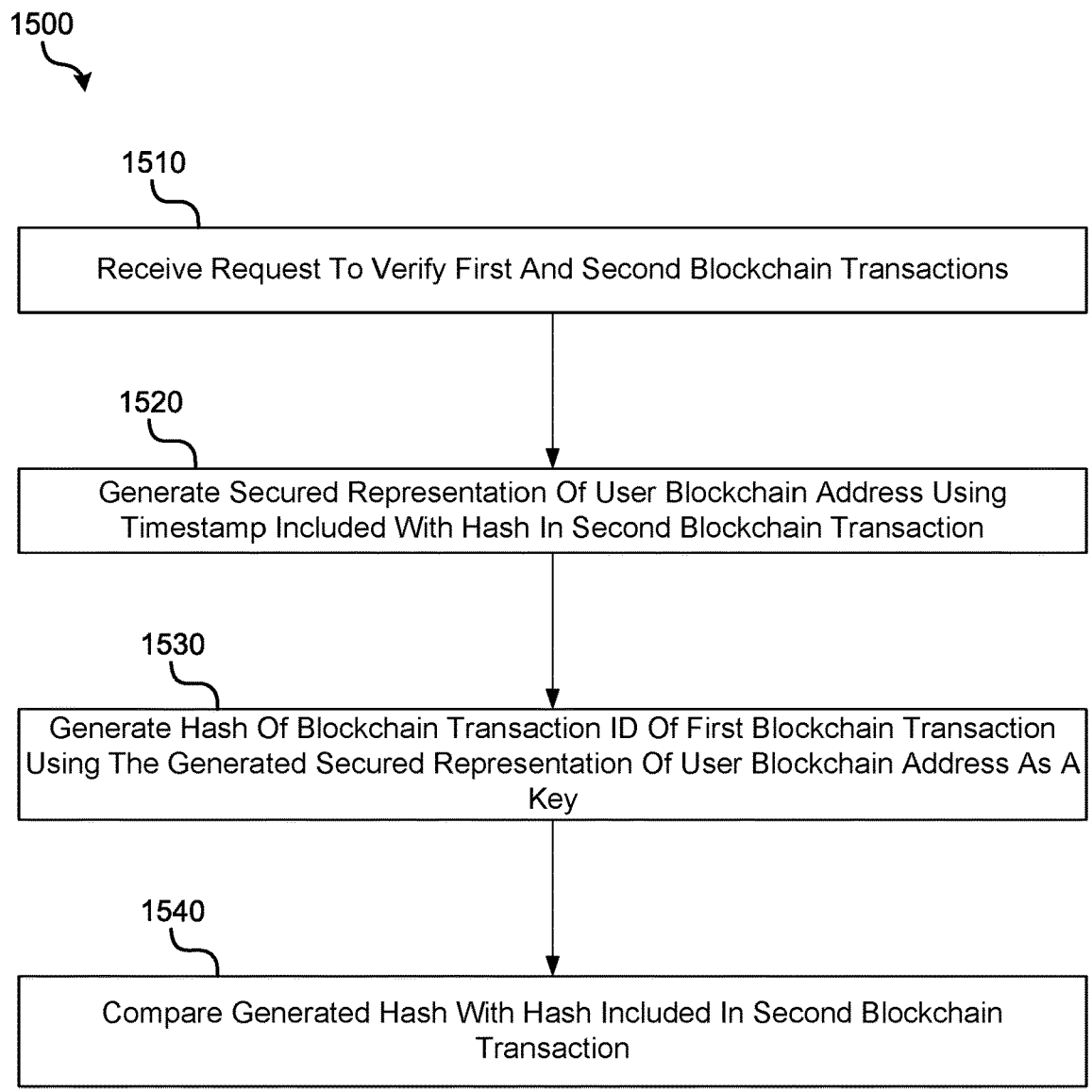
FIG. 14 is an operational flow diagram illustrating an example method that may be implemented by a server system, in accordance with implementations of the disclosure.

FIG. 14 is an operational flow diagram illustrating an example method 1500 that may be implemented by a server system (e.g., verifier 500 and/or blockchain address mapping server system 600), in accordance with implementations of the disclosure. Some or all of the operations of method 1000 may be implemented by a processing device executing instructions stored in a machine readable medium.

At operation 1510, a request is received to verify first and second blockchain transactions. In some implementations, the request may include an ID of each of the first and second blockchain transactions, to allow the server system to look up the transactions on the blockchain network 700. The first blockchain transaction may include the off-chain transaction ID, a secured representation of the user blockchain address, and a secured representation of the agent blockchain address. It may also include a secured representation of a blockchain address of a location of the off-chain transaction. The second blockchain transaction may include the blockchain transaction ID of the first blockchain transaction and a hash of the first blockchain transaction ID, with an appended time stamp. The secured representation of the user blockchain address included in the first blockchain transaction may have been generated at a time before the timestamp.

At operation 1520, a secured representation of the user blockchain address is generated using the timestamp. For example, a clear version of the user blockchain address may be retrieved from database 691, and a cryptographic time-based hash function may be applied to the user blockchain address and retrieved timestamp. For example, an HMAC algorithm may be applied. The timestamp may be retrieved from the second blockchain transaction prior to operation 1520.

At operation 1530, a hash of the first blockchain transaction ID is generated using the generated secured representation of the user blockchain address as a key. At operation 1540, the generated hash is compared with the hash included in the second blockchain transaction to verify that the hash included in the second blockchain transaction is valid.

Method for Reusing Transaction Provenance & Distributed Attestation on Blockchain with Hidden Identity & Verifiable Claims Following generation of a distributed attestation to a transaction on a blockchain (e.g. distributed attestation as described above with reference to FIGS. 1-14), the distributed attestation may serve as a verifiable claim by a party involved in the transaction. For example, in the environment of FIGS. 1-14, the distributed attestation, by virtue of referencing or including the off-chain transaction ID along with the secured representation of the user's blockchain address, may serve as a verifiable claim that the user can use as a proof of transacting any value say buying goods, sharing data, spending time during the purchaser's interaction with a particular service provider or agent (e.g., also included as a secured representation of the agent's blockchain address). Further, by virtue of hiding the identities of the parties and/or the location as secured representations of blockchain addresses, only approved parties may understand and/or act upon the attestation. A distributed attestation A-Tx-B2 may attest, for example, that transactions associated with IDs Tx-B2, Tx-B1, and Tx-id are valid transactions between claimed entities at an approved location for them to interact.

Figure 15:
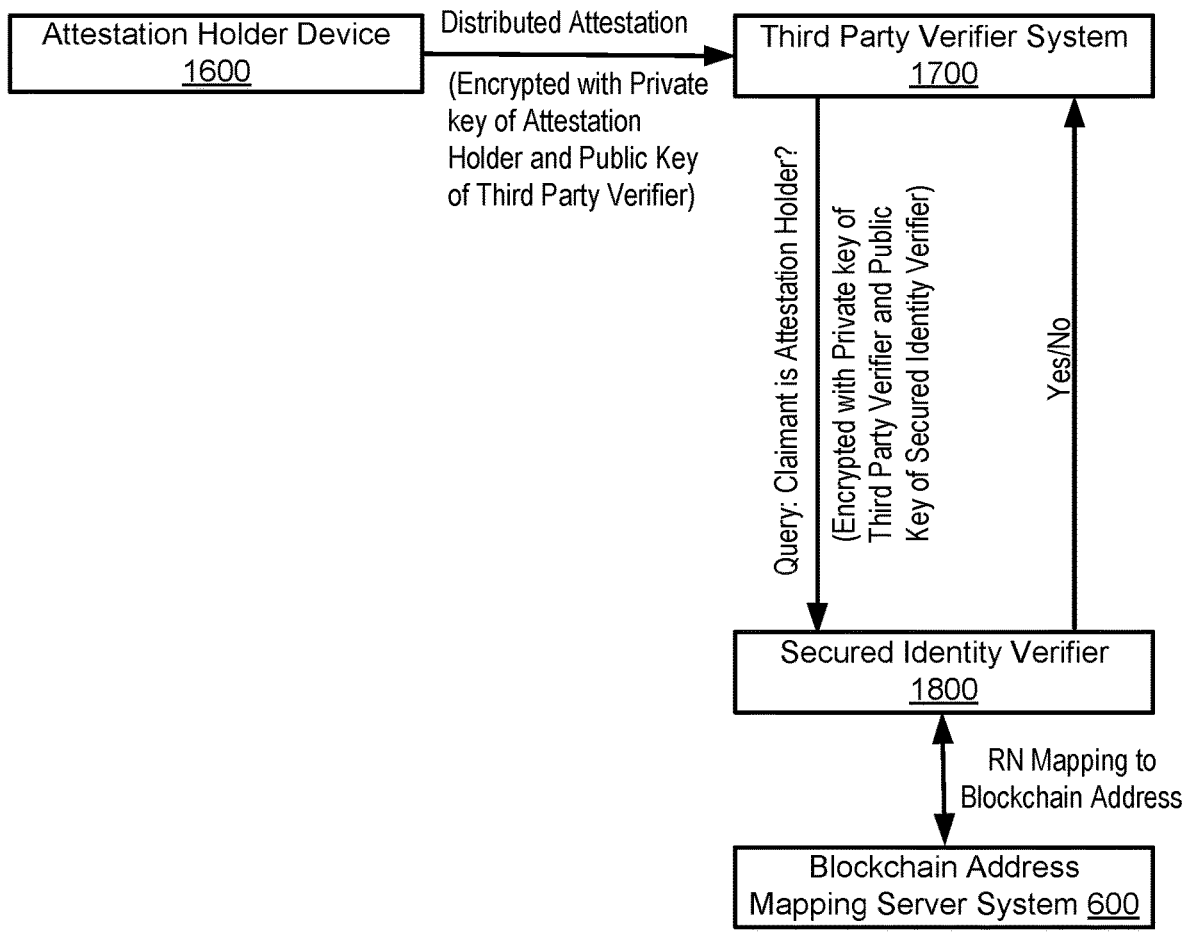
FIG. 15 illustrates an example environment by which a distributed attestation may be presented as a verifiable claim by an attestation holder associated with attestation holder device to a third party verifier associated with third party verifier system, in accordance with implementations of the disclosure.

FIG. 15 illustrates an example environment by which a distributed attestation may be presented as a verifiable claim by an attestation holder associated with attestation holder device 1600 to a third party verifier associated with third party verifier system 1700, in accordance with implementations of the disclosure. In some cases, the attestation holder may correspond to a user of user device 200 that was involved in a transaction that is attested to on a blockchain network.

As illustrated in FIG. 15, and further described below, an attestation holder device 1600 is configured to obtain a distributed attestation, generate an encrypted message by encrypting (e.g., signing) the distributed attestation with a private key of the attestation holder (e.g., private key 213) and public key of the third party verifier, and sending the encrypted distributed attestation to a third party verifier system 1700 as a verifiable claim. Encrypting the message with the public key of the recipient (third party verifier) ensures that it can be only be unencrypted with the private key of the recipient, which is only with the recipient. For simplicity of discussion, as used herein, the phrase "obtaining a distributed attestation" may refer to obtaining a copy of the distributed attestation stored on the blockchain or obtaining the identifier or address of the distributed attestation that may be used to lookup the distributed attestation on a blockchain network. Similarly, the phrase "receiving a distributed attestation" (or encrypted messages including the distributed attestation) may refer to receiving a copy of the distributed attestation stored on the blockchain or receiving an identifier or address of the distributed attestation that may be used to lookup the distributed attestation on the blockchain network.

In response to receiving the encrypted distributed attestation, the third party verifier system 1700 may decrypt the encrypted message using its private key and the public key (e.g., public key 214) associated with user 1600, determine that the message is a distributed attestation (e.g., by looking up the blockchain reference of the distributed attestation), and query secured identity verifier 1800 to determine if the distributed attestation is owned by or otherwise associated with the attestation holder. It may also send the distributed attestation to secured identity verifier 1800 to determine if it is authorized to provide a service or other response to the claim. The communication between the third party verifier and the secured identity verifier may be secured with public key infrastructure (PKI).

Secured identity verifier 1800 may determine based on an identity of third party verifier system 1700 (e.g., public key) if it is authorized to access information relating to the distributed attestation. As such, the example environment of FIG. 15 allows for role-based control whereby a secured identity verifier can determine, based on the identity of a requesting third party verifier, whether the third party verifier is permitted to validate and check identity of an attestation holder. It should be appreciated, however, that alternative systems without role-based control of verifiers may be implemented. For example, in some cases an attestation holder may present the distributed attestation to a party that was involved in a transaction attested to in the distributed attestation.

Secured identity verifier 1800 may access blockchain address mapping server system 600 to map to clear versions any secured representations of blockchain addresses appearing in the distributed attestation or in transactions referenced by the distributed attestation, and determine if any of the blockchain addresses appearing in the distributed attestation or in a transaction referenced by the distributed attestation are associated with the blockchain address (e.g., derived from the private key) of the attestation holder. If yes, secured identity verifier 1800 may provide an indication to third party verifier system 1700 that the attestation holder is the owner or otherwise associated with the distributed attestation, and thus has a claim. If no, secured identity verifier 1800 may provide an indication that the attestation holder is not associated with the distributed attestation, and thus has no claim. In some implementations, an additional verifier may be involved in the process. For example, rather than query a secured identity verifier, third party verifier system 1700 may query another system that then queries the secured identity verifier 1800.

By way of illustrative example, consider an environment where a distributed attestation attests to a transaction involving a purchase of a television. The distributed attestation may include a secured representation of the purchaser's blockchain address. The purchaser, through a blockchain application, may encrypt a message including the distributed attestation (e.g., reference or copy of attestation), and send the encrypted message to a service center that repairs televisions (e.g., third party verifier) as part of a claims process. The service center may present the distributed attestation to a secured identity verifier by sending it in a message encrypted with the service center's private key and the public key of the secured Identity verifier. The secured identity verifier may confirm the identity of the purchaser and service center. If the service center is approved based on its role to obtain information from the attestation, the secured identity verifier may inform the service center that the attestation is a valid attestation provided to the buyer.

Figure 16:
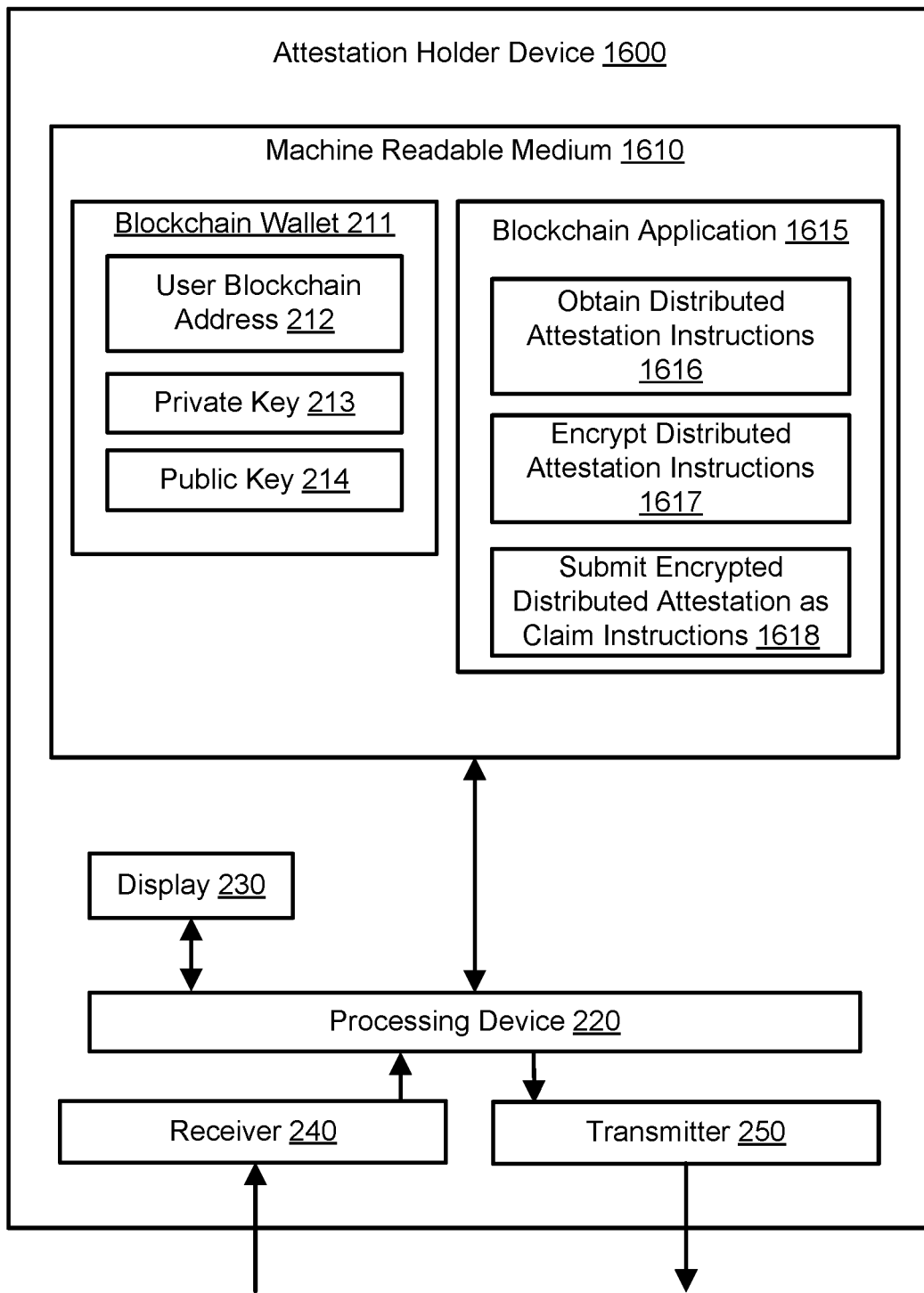
FIG. 16 illustrates an example architecture of components of an attestation holder device, in accordance with implementations of the disclosure.

FIG. 16 illustrates an example architecture of components of an attestation holder device 1600, in accordance with implementations of the disclosure. Device 1600 may comprise a machine readable medium 1610, processing device 220, display 230, receiver 240, and transmitter 250. The machine readable medium 1610 may comprise blockchain wallet 211 and a blockchain application 1615. Blockchain application 1615 may include obtain distributed attestation instructions 1616, that when executed by processing device 220, obtain a distributed attestation stored on a blockchain network. Blockchain application 1615 may also include encrypt distributed attestation instructions 1617, that when executed by processing device 220, encrypt (e.g., using private key 213 and public key of recipient) a message including the obtained distributed attestation. Blockchain application 1615 may further include submit encrypted distributed attestation as claim instructions 1618, that when executed by processing device 220, transmit the encrypted message to third party verifier system 1700. For example, the message may be transmitted as part of a claim made by the attestation holder device 1600. In some implementations, an attestation holder device 1600 may function as a user device 200.

Figure 17:
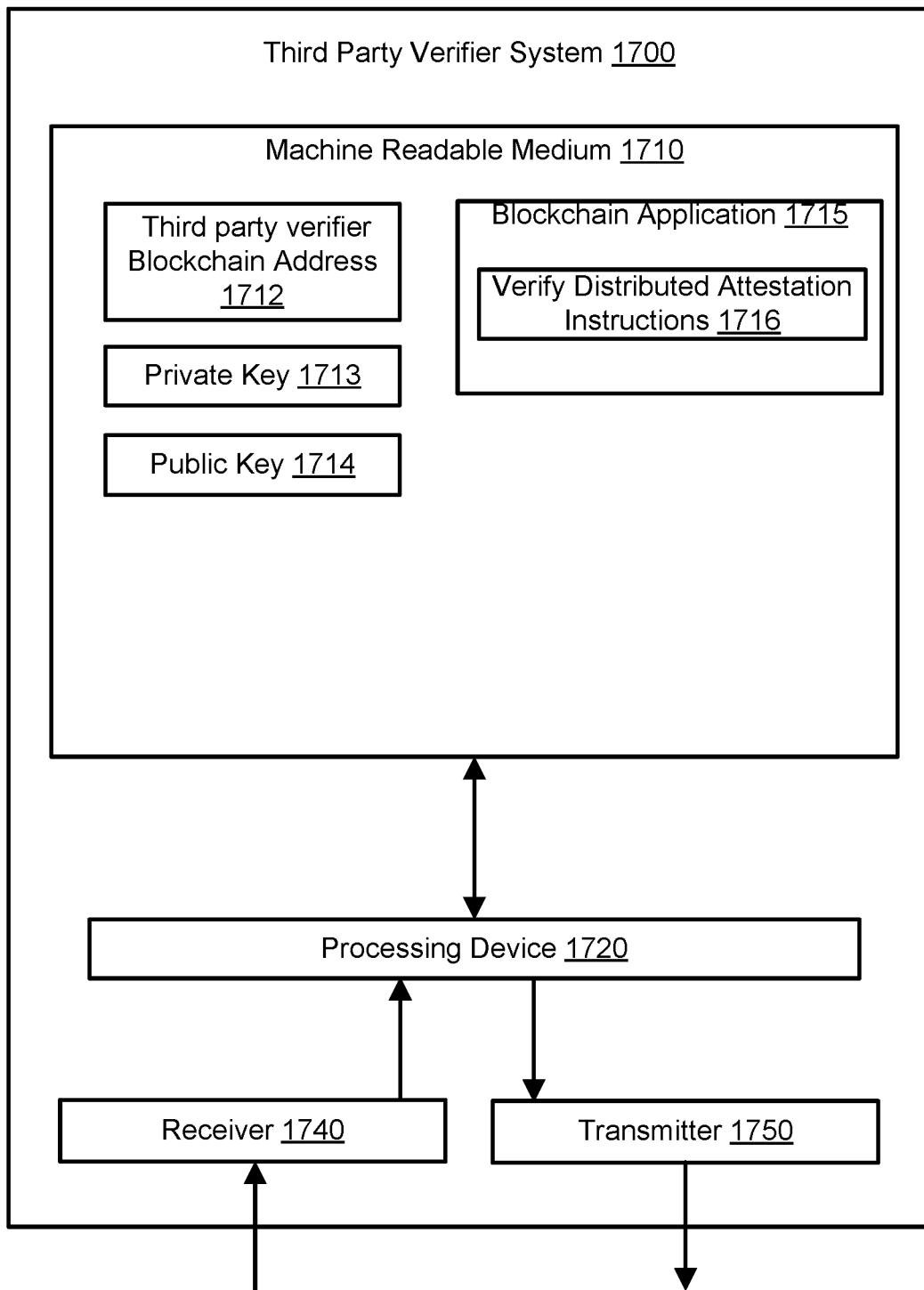
FIG. 17 illustrates an example architecture of components of a third party verifier system, in accordance with implementations of the disclosure.

FIG. 17 illustrates an example architecture of components of a third party verifier system 1700, in accordance with implementations of the disclosure. By way of illustrative example, third party verifier system 1700 may correspond to a third party verifier such as a pharmacy store ascertaining the appropriate compliance in conditions needed to be maintained by a supply chain company while transporting a medicine by checking its attestation, a service center ascertaining the purchase and valid warranty for a product for which a service is requested, an employer ascertaining that its prospective employee had attended a seminar at a particular place and time as the employee claims, an e-retail company ascertaining that the drone of a drone delivery company had delivered a product to a customer at a point in space time for making payments.

Third party verifier system 1700 may comprise a machine readable medium 1710, a processing device 1720, and a receiver 1740 and transmitter 1750 configured to receive or transmit communications from/to a device 1600 or secured identity verifier 1800.

Machine readable medium 1710 may store a blockchain address 1712 corresponding to the third party verifier, and a private key 1713 and public key 1714 corresponding to the blockchain address 1712. Machine readable medium 1710 may also store a blockchain application 1715. Application 1715 may include instructions 1716, that when executed by a processing device 1720, receive, from a sender (e.g., attestation holder device 1600) an encrypted message including a distributed attestation, decrypt the message using a public key of the sender, and query a secured identity verifier 1800 to confirm that that the distributed attestation is associated with the sender.

Figure 18:
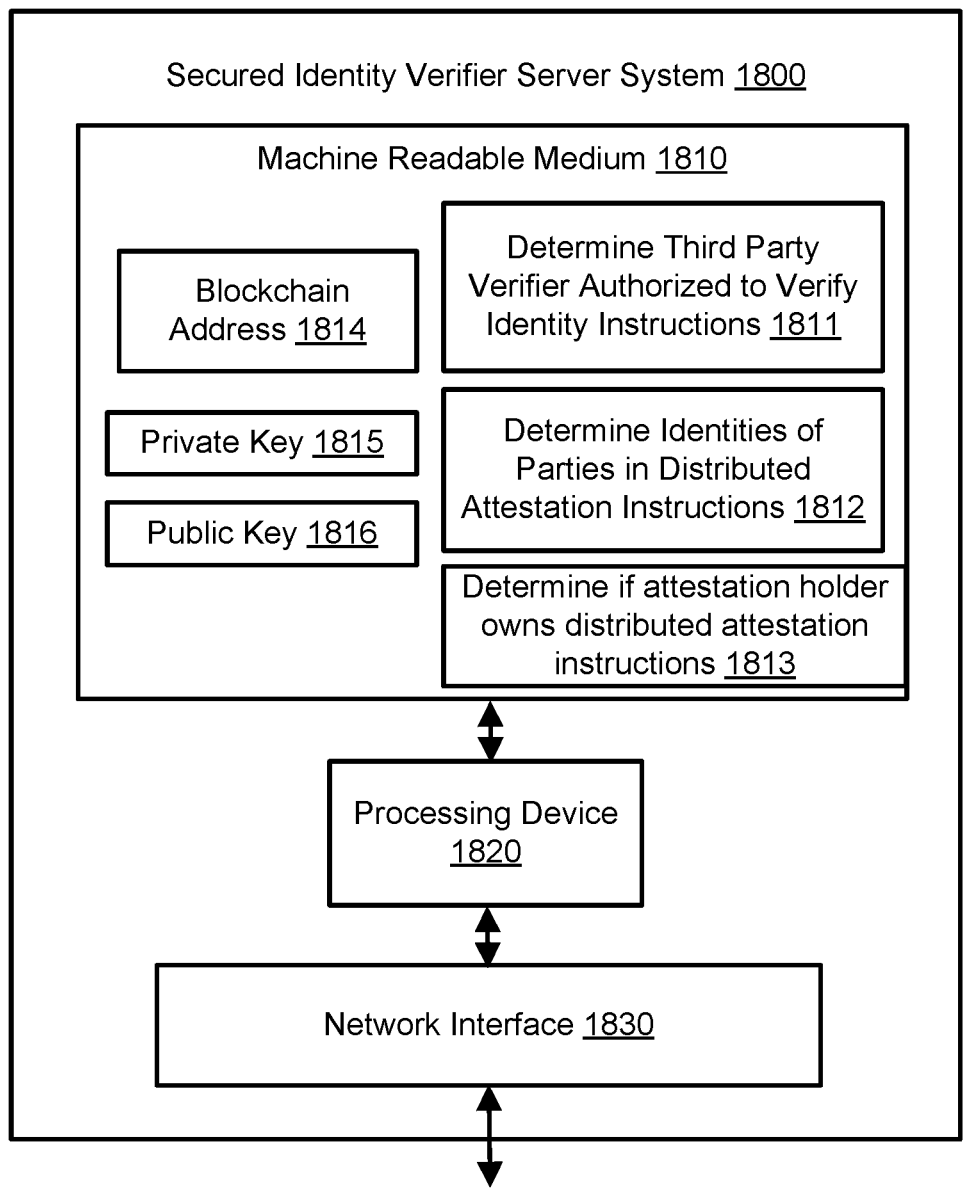
FIG. 18 illustrates an example architecture of components of secured identity verifier server system, in accordance with implementations of the disclosure.

FIG. 18 illustrates an example architecture of components of secured identity verifier server system 1800, in accordance with implementations of the disclosure. A secured identity verifier server system 1800 (referred to herein as "secured identity verifier 1800") may be configured to receive queries from a third party verifier system 1700 to determine if a distributed attestation is owned by or otherwise associated with an attestation holder (e.g., by querying blockchain address mapping server system 600). It may also be configured to determine if the third party verifier is authorized, based on its identity, to verify attestation identities (e.g., determine actual identities of parties associated with secured represent of blockchain addresses) contained in a distributed attestation. In particular implementations, secured identity verifier may be configured to determine if the third party verifier has role based access to obtain any information about a distributed attestation. Secured identity verifier 1800 may be implemented as a server system of a central bank.

Secured identity verifier 1800 may include a machine readable medium 1810, processing device 1820, and network interface 1830. Network interface 1830 may be configured to communicate with attestation holder device 1600, third party verifier system 1700, and/or blockchain address mapping server system 600.

Machine readable medium 1810 may store a blockchain address 1814 corresponding to the third party verifier, and a private key 1815 and public key 1816 corresponding to the blockchain address 1814.

Machine readable medium 1810 may store instructions 1811, that when executed by a processing device 1820, determine that a third party verifier is authorized to verify identities of parties contained in a distributed attestation. Additionally, machine readable medium 1810 may store instructions 1812, that when executed by a processing device 1820, cause secured identity verifier 1800 to determine identities of parties contained in a distributed attestation (e.g., determine clear versions of secured representations of blockchain addresses). Additionally, machine readable medium 1810 may store instructions 1813, that when executed by a processing device 1820, cause secured identity verifier 1800 to determine if a an attestation holder owns the distributed attestation (e.g., if a secured representation of the attestation holder's blockchain address appears in the distributed attestation).

Figure 19:
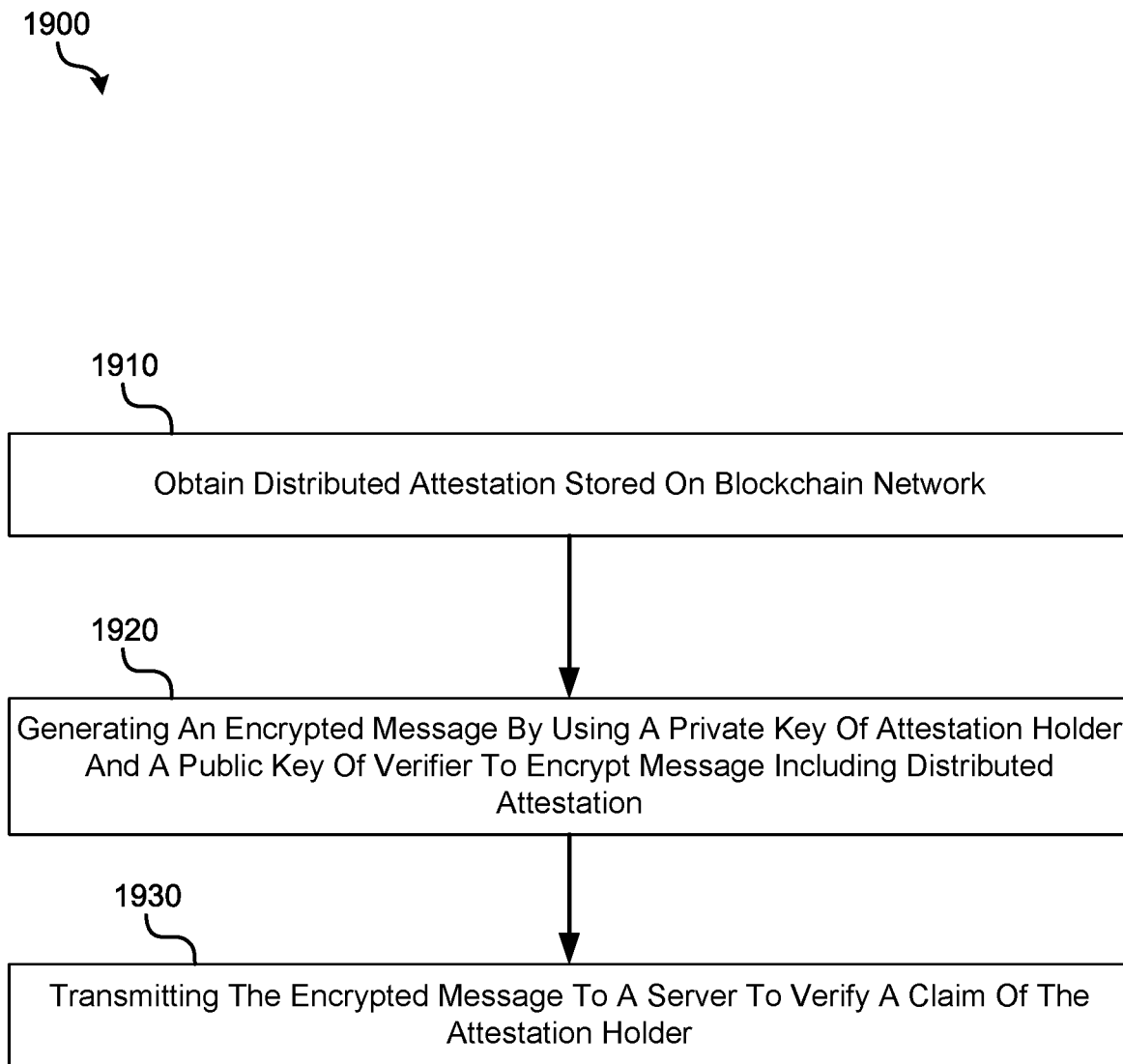
FIG. 19 is an operational flow diagram illustrating an example method that may be implemented by an attestation holder device, in accordance with implementations of the disclosure.

FIG. 19 is an operational flow diagram illustrating an example method 1900 that may be implemented by an attestation holder device 1600, in accordance with implementations of the disclosure. Some or all of the operations of method 1900 may be implemented by a processing device 220 executing instructions 1616-1618.

At operation 1910, attestation holder device 1600 obtains a distributed attestation stored on a blockchain network. For example, the attestation holder device 1600 may obtain a blockchain ID of the distributed attestation or lookup the distributed attestation at its blockchain ID, and retrieve a copy. The distributed attestation obtained by the attestation holder device 1600 may comprise a secured representation of the blockchain address 212 of the user of the attestation holder device 1600 or a reference to a blockchain transaction comprising the secured representation of the user's blockchain address. The blockchain address may be associated with a private key of the user.

In particular implementations, the distributed attestation comprises an off-chain transaction identifier or a reference to a blockchain transaction comprising the off-chain transaction identifier. In some implementations, the attestation holder device 1600 may maintain a stored record of blockchain and/or off-chain transaction IDs that a user of the device was a party to, and use the stored record to lookup distributed attestations.

At operation 1920, the attestation holder device 1600 generates an encrypted message by using a private key of the attestation holder and a public key of a recipient (e.g., verifier such as a third party verifier or otherwise) to encrypt a message including the distributed attestation. Attestation holder device 1600 may use a private key 213 derived from blockchain address 212 and the public key of the recipient (third party verifier) to generate the encrypted message.

At operation 1930, the attestation holder device 1600 transmits the encrypted message to a server (e.g. third party verifier system 1700) to verify a claim of the attestation holder. The attestation holder's public key may be known to all participants of the blockchain network. In this manner, it may be confirmed by the recipient (e.g., third party verifier) that the attestation holder device 1600 is the originator of the message. Additionally, by using the public key of the recipient to encrypt the message only the recipient may decrypt the message using its private key.

In various implementations, the attestation holder device 1600 may submit the distributed attestation to obtain consideration for a claim. For example, the user of the attestation holder device 1600 may present the distributed attestation for purposes of a warranty claim, an insurance claim, a refund, to obtain a service, to receive payment for having provided a good, asset, and/or service, etc. The presented distributed attestation may be provided to prove a transaction done by a user in the past. In particular implementations, the distributed attestation provides proof of at least one of: the user's presence at a location at a particular time; the user's custody of an asset or consumption of a service, at a particular time; the user's purchase of an asset or a service at a particular time; and the user's compliance with handling of an asset or rendering of a service.

Following transmission of the encrypted message and verification by a verifier, attestation holder device 1600 may receive a confirmation message confirming that the distributed attestation is a valid claim made by the user. Thereafter the user of attestation holder may be compensated or receive a good, asset, or service for the claim. In some implementations, the encrypted message is transmitted to a third party verifier system 1700 that is configured to query a secured identity verifier to determine if a claimant of a distributed attestation is in the fact the attestation holder. The secured identity verifier may, after determining that the third party verifier is authorized to obtain information about the distributed attestation (e.g., based on role based access control), query a blockchain address mapping server system 600 to answer the query. Alternatively, in other implementations, the encrypted message may be transmitted to a verifier system that access to a blockchain address mapping server system.

Figure 20:
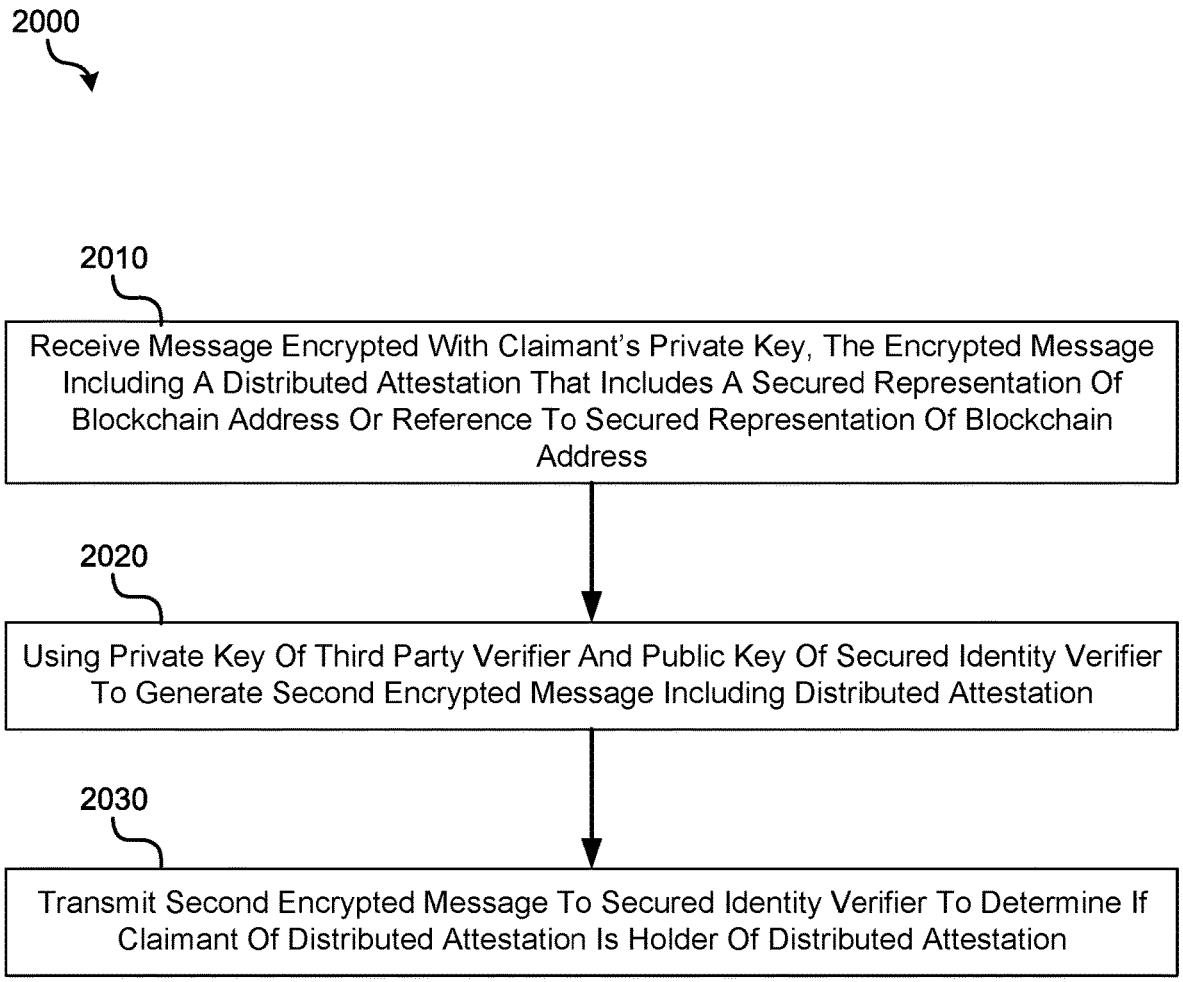
FIG. 20 is an operational flow diagram illustrating an example method that may be implemented by a third party verifier system (e.g., a server system), in accordance with implementations of the disclosure.

FIG. 20 is an operational flow diagram illustrating an example method 2000 that may be implemented by a third party verifier system 1700 (e.g., a server system), in accordance with implementations of the disclosure. Some or all of the operations of method 2000 may be implemented by a processing device 1820 executing instructions 1811-1813.

At operation 2010 system 1700 receives a message encrypted with a claimant's private key and the third party verifier's public key, the encrypted message including a distributed attestation stored on a blockchain network, where the distributed attestation includes a secured representation of a blockchain address or a reference to the secured representation of the blockchain address. The message may be submitted as part of a claim made by a claimant to an entity associated with third party verifier system 1700.

In implementations, third party verifier system 1700 may determine whether it can service or provide some type of action in response to the claim made by the claimant. By way of particular example, after decrypting the message with the public key of the attestation holder and its own private key, the third party verifier system 1700 may review distributed attestation A-Tx-B2 and observe that it contains an off-chain transaction ID (e.g., Tx-id) that is valid. For example, the off-chain transaction ID may be associated with purchasing a product, and the system 1700 may have database of valid off-chain transaction IDs, for which it may provide a warranty service, or other applicable service.

At operation 2020, system 1700 uses a private key of an entity associated with system 1700 (e.g., private key 1713) and a public key of the secured identity verifier (e.g., public key 1816) to encrypt a message including the distributed attestation. In this manner, the message may only be decrypted by the private key of the secured identity verifier. Additionally, the secured identity verifier can confirm that the third party verifier is the sender by using and successfully decrypting the message using the public key of third party verifier.

At operation 2030, system 1700 transmits the second encrypted message to secured identity verifier 1800 to determine if the claimant of the distributed attestation is associated with the distributed attestation. attestation holder and/or to determine if the entity associated with system 1700 is authorized to view identities contained in the distributed attestation.

Afterward, system 1700 may receive a message from the secured identity verifier 1800 confirming that the claimant is the distributed attestation holder. In response, a service may be performed for the claimant. Alternatively, in cases where the distributed attestation does not include any secured representations of blockchain addresses associated with the claimant, system 1700 may receive a message from the verifier 1800 indicating that the claimant is not the distributed attestation holder.

Figure 21:
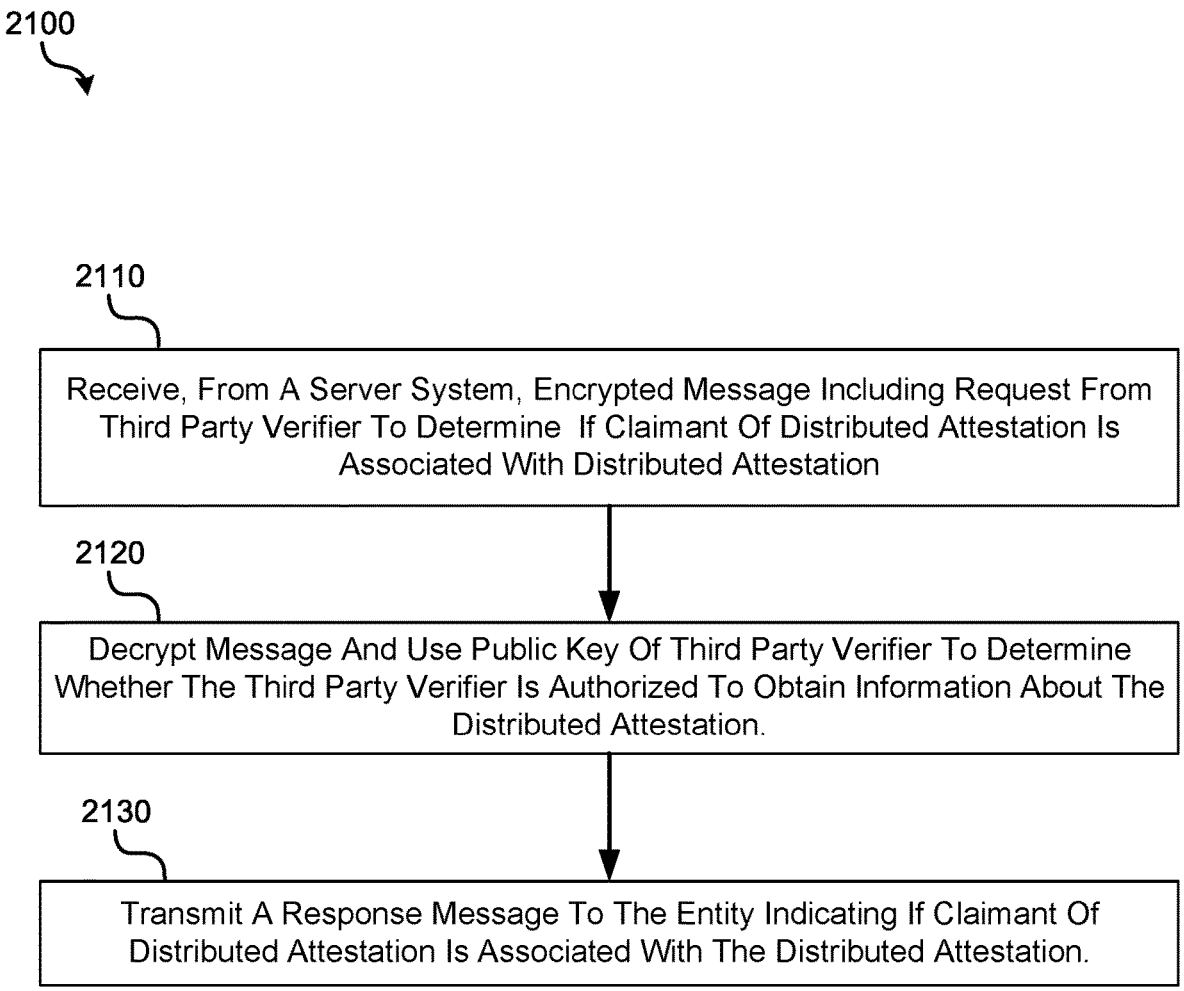
FIG. 21 is an operational flow diagram illustrating an example method that may be implemented by a secured identity verifier (e.g., a server system), in accordance with implementations of the disclosure.

FIG. 21 is an operational flow diagram illustrating an example method 2100 that may be implemented by a secured identity verifier 1800 (e.g., a server system), in accordance with implementations of the disclosure. Some or all of the operations of method 2100 may be implemented by a processing device 1820 executing instructions 1716.

At operation 2110, verifier 1800 receives, from a server system, a request from an entity (e.g., third party verifier) to determine if a distributed attestation stored on a blockchain is associated with an attestation holder. In various implementations, the request is encrypted using a private key of the entity and a public key of the secured identity verifier, and the distributed attestation includes a secured representation of a blockchain address.

At operation 2120, verifier 1800 decrypts the message (e.g., using its private key and public key of entity), and uses the public key of the entity to determine whether the entity (e.g., third party verifier) is authorized to obtain information about the distributed attestation. In particular implementations, secured identity verifier may use the public key of the entity to determine if the entity has role based access rights to obtain any information (e.g., identities associated with secured representations of blockchain addresses) about the distributed attestation. This determination may be made in accordance with a role based access control configured for a plurality of third party verifiers, where the role based access control may be used to validated if a third party verifier has rights to access information from a distributed attestation.

If the entity is authorized to obtain information from the distributed attestation transaction, at operation 2130 verifier 1800 may transmit a response message to the entity indicating if the claimant of the distributed attestation is associated with (e.g., the holder of) the distributed attestation. In implementations, the response message may not share any information about the distributed attestation other than confirming that the claimant of the distributed attestation is (or is not) the attestation holder.

To this end, prior to transmitting the response message, verifier 1800 may determine if the claimant of the distributed attestation is associated with the distributed attestation by querying a database (e.g., database 691) that maintains, over time, a mapping between secured representations of blockchain addresses and their clear versions. During the query, verifier 1800 may determine clear versions of blockchain addresses in the distributed attestation, and determine if the one of the clear versions of the blockchain address is associated with the claimant (e.g., based on the public key of the claimant).

The illustrated systems and methods for using a distributed attestation as a verifiable claim by a party involved in a transaction may provide several benefits. They may provide an environment where identity in the verifiable claims is hidden and based on location, using a centralized system (e.g., secured identity verifier 1800) to control verification of attestation. They may provide a role-based control system for verifiers who can validate and check identities of holders of verifiable claims. Additionally, holders of verifiable claims may share information or attestation using public/private keys to service providers and a secured identity verifier, which showcases the consent from the holder for sharing information with a service provider in the distributed ecosystem.

Figure 22:
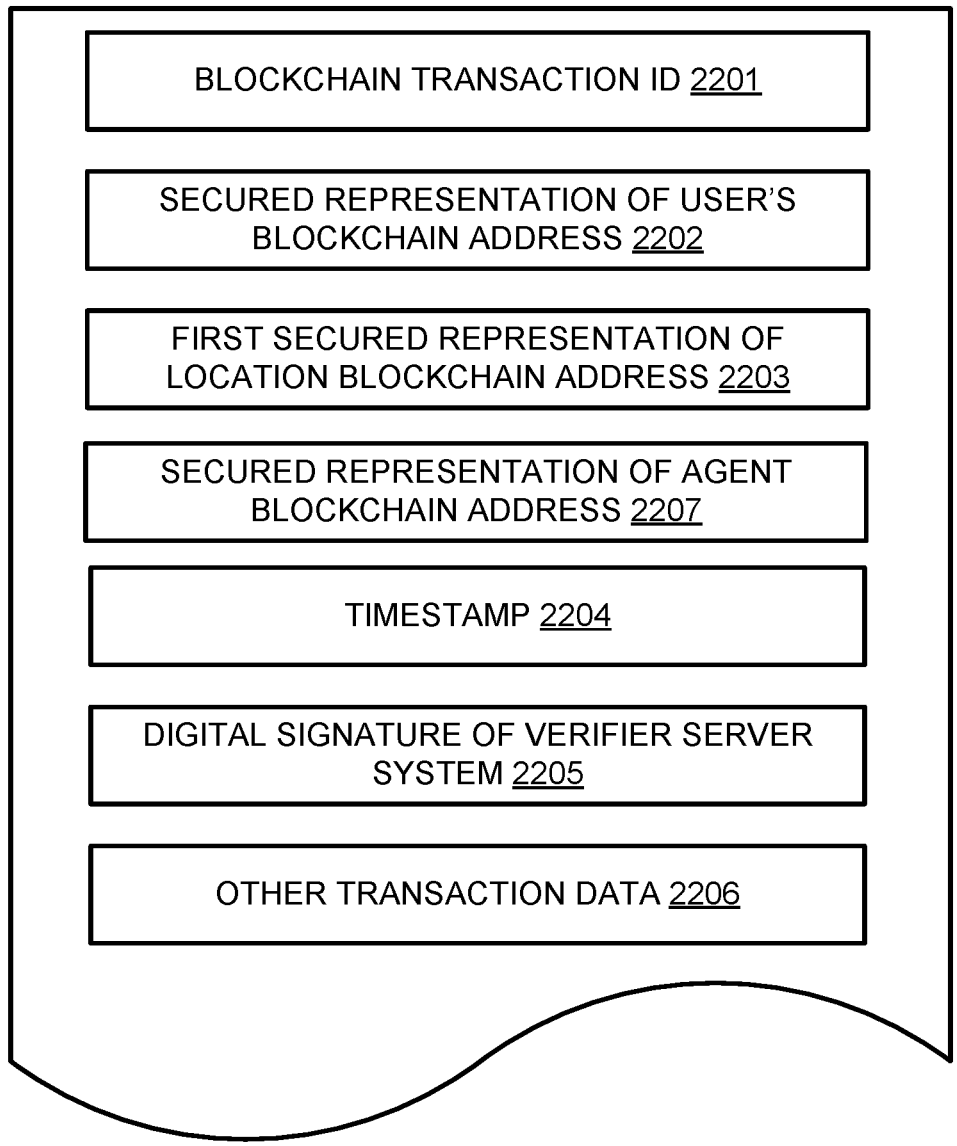
FIG. 22 illustrates an example of distributed attestation that may be presented by a user to a verifier during a verifiable claims process, in accordance with implementations of the disclosure.
Figure 23:
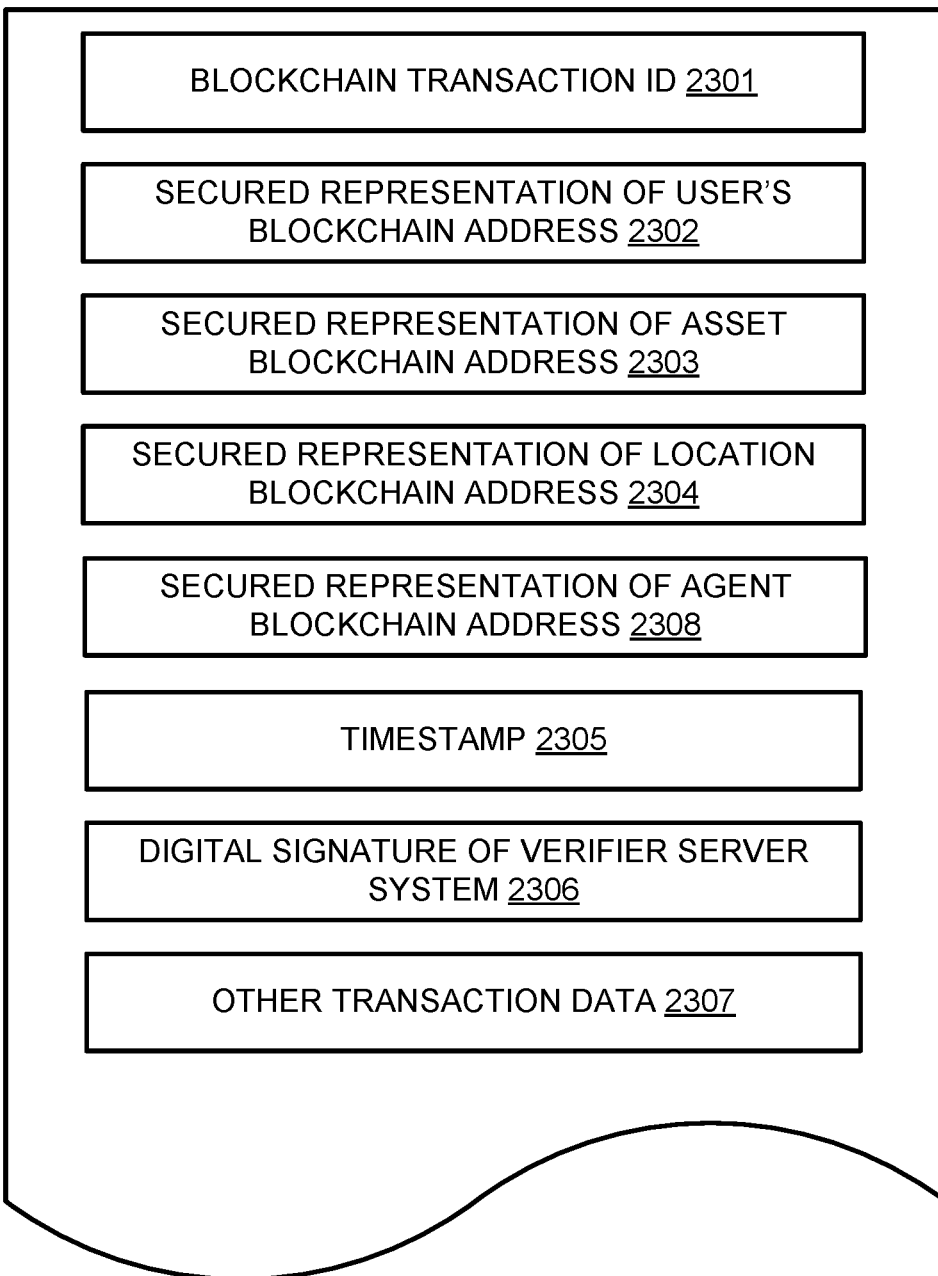
FIG. 23 illustrates an example of distributed attestation that may be presented by a user to a verifier during a verifiable claims process, in accordance with implementations of the disclosure.
Figure 24:
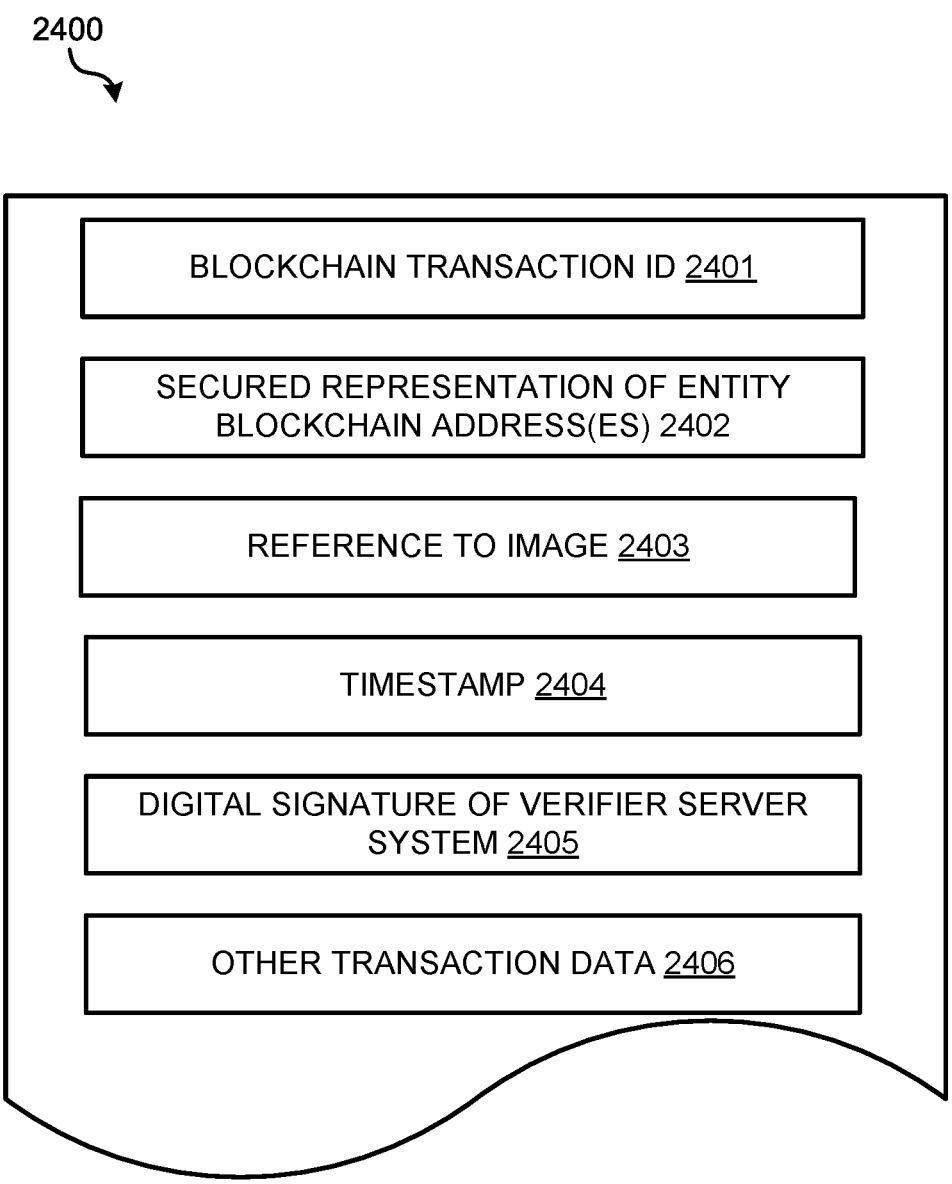
FIG. 24 illustrates an example of distributed attestation that may be presented by a user to a verifier during a verifiable claims process, in accordance with implementations of the disclosure.

FIGS. 22-24 illustrate three particular examples of distributed attestations that may be presented by a user to a verifier during a verifiable claims process. FIG. 22 illustrates a distributed attestation 2200 that may be presented by a user (e.g., attestation holder) as part of a claims process where the user is required to show that they were present at a particular location at a particular time. For example, distributed attestation 2200 may be presented by an individual to prove their attendance at a seminar or workshop held in a particular location in the past, for which the individual is now seeking credit.

Distributed attestation 2200 may be recorded on a blockchain of any suitable blockchain network, or it may be recorded on some other blockchain of a blockchain network. Distributed attestation 2200 may include a blockchain transaction ID 2201, a secured representation of a user's blockchain address 2202, a secured representation of an agent blockchain address 2207, the agent being a service provider or other agent with whom the transaction was made by the user, a secured representation of a location blockchain address 2203, a timestamp 2204 identifying when the attested event occurred (e.g., when user was at the location), a digital signature 2205 of a verifier (e.g., secured identity verifier) attesting to the data contained in the attestation, and other transaction data 2206 (e.g., public keys associated with location, user, and verifier that signed attestation, and a transactional timestamp showing when the attestation was actually granted by the verifier).

FIG. 23 illustrates a distributed attestation 2300 that may be presented by a user to a verifier as part of a claims process where the user is required to show that the user had custody of an asset at a particular location and time. For example, distributed attestation 2300 may be presented to a third party verifier to prove that user delivered a package at a particular time in the past.

Distributed attestation 2300 may be recorded on a blockchain of any suitable blockchain network. Distributed attestation 2300 may include a blockchain transaction ID 2301, a secured representation of the user's blockchain address 2302, a secured representation of the asset blockchain address 2303, a secured representation of the location blockchain address 2304, a secured representation of an agent blockchain address 2308, the agent being a service provider or other agent with whom the transaction was made by the user, a timestamp 2305 identifying when the event occurred (e.g., when user had custody of the asset), a digital signature 2306 of a verifier attesting to the data contained in the attestation, and other transaction data 2307 (e.g., public keys associated with location, asset, user, and verifier that signed attestation, transactional time stamp showing when the attestation was actually granted by the verifier).

FIG. 24 illustrates a distributed attestation 2400 that may be presented by a user to a verifier as part of a claims process where the user is required to demonstrate the veracity of a captured image along with the identity of an entity embedded in the captured image. For example, distributed attestation 2400 may include an image or reference to an image of two vehicles after a collision, along with a secured representation of a blockchain address of an owner of one of the vehicles. In this scenario, the distributed attestation may be presented by the owner of the vehicle for an insurance claim to prove an accident occurred at a particular time and place between two vehicles.

Distributed attestation 2400 may be recorded on a blockchain of any suitable blockchain network. Distributed attestation 2400 may include a blockchain transaction ID 2401, a secured representation of an entity blockchain address 2402 (e.g. vehicle of owner presenting claim), a reference to an image 2403, a timestamp 2404 of the time when the image was taken by the user, a digital signature 2405 of a verifier (e.g., secured identity verifier) attesting to the data contained in the attestation, and other transaction data 2406 (e.g., secured representation of location blockchain address, secured representation of user blockchain address, GPS coordinates, and/or public keys associated with entity, verifier that signed attestation, location, a timestamp of the transaction, and/or user, etc.). In implementations, the reference to the image 2403 may be a pointer, which may be the blockchain address of a storage location or storage transaction that stores the image on the blockchain network. In other implementations, the distributed attestation may include the image.

As illustrated by the foregoing example distributed attestations 2200-2400, although they are available for viewing by other nodes on a blockchain network, they disclose a limited amount of information. In particular, they include secured representations of blockchain addresses corresponding to users (e.g., carrier of client device), locations, assets, and/or entities. By virtue of disclosing a limited amount of information, the identities of users, locations, assets, and/or entities associated with a transaction may be masked from other nodes on a blockchain network that do not need to know this information. Further, a user or other attestation holder associated with the secured representation of the a blockchain address in the distributed attestation may provide the distributed attestation as a verifiable claim to any authorized verifier as needed.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

In this document, a "server system" may refer to a system of one or more servers.

As described herein, user devices, agent systems, server systems, verifiers, beacon devices, and other devices may implement some or all of their components within a trusted execution environment.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer readable medium having executable instructions stored thereon, that, when executed by a processor, performs operations of:
   receiving, by a first node in a distributed ledger network comprising a plurality of nodes, a distributed ledger maintained on the distributed ledger network;
   storing the distributed ledger at the first node;
   receiving, by the first node, a request from a system to verify a distributed ledger transaction recorded on the distributed ledger, the system being a second node of the plurality of nodes, the distributed ledger transaction comprising a distributed ledger transaction identifier (ID), an off-chain transaction ID, and a first secured representation of a distributed ledger address, the distributed ledger address being stored at the first node and corresponding to an entity involved in an off-chain transaction associated with the off-chain transaction ID;
   generating, by the first node, a second secured representation of the distributed ledger address;
   masking, by the first node, an identity of the entity from the system at least in part by generating a hash of the distributed ledger transaction ID using the generated second secured representation of the distributed ledger address as a key, wherein a hashing function used to the generate the hash is not known to the system; and
   transmitting, by the first node, the hash to the system, wherein the hashing function is transparent to an off-chain verifier system that receives a value corresponding to the hash from the system such that the off-chain verifier system is unable to determine whether the received value is the secured representation of the distributed ledger address or the hash of the distributed ledger transaction ID using the secured representation of the distributed ledger address.

2. The non-transitory computer readable medium of claim 1, wherein the instructions, when executed by the processor, further perform an operation of: transmitting a timestamp to the system, wherein the timestamp corresponds to a time when the second secured representation of the distributed ledger address was generated.

3. The non-transitory computer readable medium of claim 2 wherein the instructions, when executed by the processor, further perform an operation of: attaching the timestamp to the hash, wherein transmitting the hash comprises transmitting the hash with the attached timestamp.

4. The non-transitory computer readable medium of claim 2, wherein the second secured representation of the distributed ledger address is generated at a time after the first secured representation of the distributed ledger address.

5. The non-transitory computer readable medium of claim 1, wherein the transmitted hash signals an approval of the distributed ledger transaction.

6. The non-transitory computer readable medium of claim 2, wherein the instructions, when executed by the processor, further perform operations of:
   receiving the off-chain transaction identifier; and
   in response to receiving the off-chain transaction identifier, providing the first secured representation of the distributed ledger address to the system.

7. The non-transitory computer readable medium of claim 6, wherein the instructions, when executed by the processor, further perform operations of: generating the first secured representation of the distributed ledger addresses at a first time before the timestamp.

8. The non-transitory computer readable medium of claim 1, wherein the distributed ledger address is a distributed ledger address associated with the user, wherein the off-chain transaction Id corresponds to an off-chain transaction involving the user.

9. A method, comprising:
   receiving, by a first node in a distributed ledger network comprising a plurality of nodes, a distributed ledger maintained on the distributed ledger network, the first node being a user device;
   storing the distributed ledger at the user device;
   receiving, using the user device, a request from a system to verify a distributed ledger transaction recorded on the distributed ledger, the system being a second node of the plurality of nodes, the distributed ledger transaction comprising a distributed ledger transaction identifier (ID), an off-chain transaction ID, and a first secured representation of a distributed ledger address, the distributed ledger address being stored at the first node and corresponding to an entity involved in an off-chain transaction associated with the off-chain transaction ID;
   generating, using the user device, a second secured representation of the distributed ledger address;
   masking, using the user device, an identity of the entity from the system at least in part by generating a hash of the distributed ledger transaction ID using the generated second secured representation of the distributed ledger address as a key, wherein a hashing function used to the generate the hash is not known to the system;
   transmitting the hash from the user device to the system, wherein the hashing function is transparent to an off-chain verifier system that receives a value corresponding to the hash from the system such that the off-chain verifier system is unable to determine whether the received value is the secured representation of the distributed ledger address or the hash of the distributed ledger transaction ID using the secured representation of the distributed ledger address; and
   transmitting a timestamp to the system, wherein the timestamp corresponds to a time when the second secured representation of the distributed ledger address was generated.

10. The method of claim 9, further comprising: using the user device to attach the timestamp to the hash, wherein transmitting the hash comprises transmitting the hash with the attached timestamp.

11. The method of claim 9, wherein the second secured representation of the distributed ledger address is generated at a time after the first secured representation of the distributed ledger address.

12. The method of claim 9, further comprising:
   receiving, using the user device, the off-chain transaction identifier; and in response to receiving the off-chain transaction identifier, providing, using the user device, the first secured representation of the distributed ledger address to the system.

13. The method of claim 12, further comprising: generating, using the user device, the first secured representation of the distributed ledger addresses at a first time before the timestamp.

14. The method of claim 9, wherein the distributed ledger address is a distributed ledger address associated with a user of the user device, wherein the off-chain transaction ID corresponds to an off-chain transaction involving the user.

* * * * *